(12) United States Patent
Richards et al.

(10) Patent No.: US 12,039,858 B2
(45) Date of Patent: Jul. 16, 2024

(54) HAPTIC FEEDBACK GENERATION

(71) Applicant: CAMBRIDGE MECHATRONICS LIMITED, Cambridge (GB)

(72) Inventors: David Charles William Richards, Cambridge (GB); Marc-Sebastian Scholz, Cambridge (GB); Thomas James Powell, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 106 days.

(21) Appl. No.: 17/289,415

(22) PCT Filed: Oct. 28, 2019

(86) PCT No.: PCT/GB2019/053042
§ 371 (c)(1),
(2) Date: Apr. 28, 2021

(87) PCT Pub. No.: WO2020/089595
PCT Pub. Date: May 7, 2020

(65) Prior Publication Data
US 2021/0398402 A1    Dec. 23, 2021

(30) Foreign Application Priority Data
Oct. 28, 2018  (GB) .................................. 1817515

(51) Int. Cl.
*G08B 6/00*  (2006.01)
(52) U.S. Cl.
CPC ..................... *G08B 6/00* (2013.01)
(58) Field of Classification Search
CPC ................... G08B 6/00; G06F 3/01

USPC ......................................... 340/407.1
See application file for complete search history.

(56) References Cited

U.S. PATENT DOCUMENTS

| | | | |
|---|---|---|---|
| 8,754,757 B1 | 6/2014 | Ullrich et al. | |
| 2010/0188327 A1 | 7/2010 | Frid et al. | |
| 2012/0062371 A1* | 3/2012 | Radivojevic | G08B 6/00 |
| | | | 340/407.1 |
| 2016/0209922 A1 | 7/2016 | Kim et al. | |
| 2018/0356888 A1* | 12/2018 | Rihn | G06F 3/016 |
| 2019/0384400 A1* | 12/2019 | Cruz-Hernandez | G06F 3/016 |
| 2020/0026354 A1* | 1/2020 | Swindells | G06F 3/016 |

(Continued)

FOREIGN PATENT DOCUMENTS

| | | |
|---|---|---|
| EP | 2 629 178 | 8/2013 |
| EP | 2 701 037 | 2/2014 |

(Continued)

OTHER PUBLICATIONS

GB Examination Report of GB Application No. 2107623.7 dated Nov. 21, 2022.

(Continued)

*Primary Examiner* — Jack K Wang
(74) *Attorney, Agent, or Firm* — Haley Guiliano LLP

(57) ABSTRACT

Broadly speaking, embodiments of the present techniques provide techniques for generating haptic feedback or haptic sensations, and in particular to techniques for outputting haptic feedback which varies depending on the input. The haptic feedback is delivered by a shape memory alloy (SMA) actuator that controls the movement of a component based on the required haptic feedback/sensation.

18 Claims, 16 Drawing Sheets

(56) References Cited

U.S. PATENT DOCUMENTS

2020/0362837 A1\* 11/2020 Bunting et al. ......... F03G 7/065
2020/0371593 A1\* 11/2020 Araújo ................... G06F 3/016
2020/0387224 A1\* 12/2020 Das .......................... G08B 6/00
2021/0365120 A1\* 11/2021 Ooi ....................... G06F 3/0414

FOREIGN PATENT DOCUMENTS

| EP | 2 806 352 | 11/2014 |
| EP | 2821912 B1 | 1/2018 |
| EP | 3293621 A2 | 3/2018 |
| EP | 2796964 B1 | 6/2020 |
| GB | 2 551 657 | 12/2017 |
| WO | WO 2006004894 | 1/2006 |
| WO | 2009051976 A1 | 4/2009 |
| WO | WO 2018046937 | 3/2018 |

OTHER PUBLICATIONS

GB Search Report dated Dec. 14, 2018 of GB Application 1817515.8.
International Search Report and Written Opinion of PCT/GB2019/053042 dated Feb. 14, 2020.

\* cited by examiner

"Click" Generation

"Soft Buzz" Generation

Trigger: Button Press

HAPTIC FEEDBACK GENERATION

CROSS-REFERENCE TO RELATED APPLICATIONS

This application is a national stage application under 35 U.S.C. § 371 of International Application PCT/GB2019/053042, filed Oct. 28, 2019, which claims priority of GB Patent Application 1817515.8, filed Oct. 28, 2018. The disclosure of which are hereby incorporated by reference herein in their entireties.

The present application generally relates to techniques for generating haptic feedback or haptic sensations, and in particular to techniques for outputting haptic feedback which varies depending on the input.

Consumer electronics devices, such as laptops and smartphones, may employ different types of controls to give users of the devices some feedback indicating that they have successfully pressed a button on the device. This is generally known as haptic feedback, and haptic buttons or controls on a device may provide a tactile sensation to the user to confirm that they have successfully pressed the button/control/switch. A haptic button may be provided as a module or assembly for incorporation within an electronic device by a device manufacturer.

The present applicant has identified the need for configurable, customisable haptic feedback, for an improved user experience and for improved operation.

DEFINITIONS

The term "haptic profile" is used generally herein to mean a description of a particular type of haptic sensation. In other words, the term "haptic profile" is used herein to mean any description, definition or way of describing/defining a particular haptic sensation that is to be delivered by an apparatus. A haptic profile may be apparatus-agnostic, or may depend on the technical specification of the apparatus or haptic assembly.

A haptic profile may be defined using one or more "primitives". The term "primitive" is used generally herein to mean a base or root value which is used to define a haptic profile, but which itself is not derived from another value.

Haptic feedback may be delivered as part of a pipeline. The term "pipeline" is used generally herein to mean a list or sequence of events or actions.

In a first approach of the present techniques, there is provided an apparatus for delivering haptic feedback comprising: a static component; a moveable component moveable relative to the static component; at least one shape memory alloy (SMA) actuator wire for moving the moveable component to deliver haptic feedback; control circuitry for controlling the at least one SMA actuator wire; and at least one processor, communicatively coupled to the control circuitry, to: receive an input signal requesting haptic feedback to be delivered; render a haptic profile defining instructions for driving the at least one SMA actuator wire; generate a haptic drive signal using the rendered haptic profile; and transmit, to the control circuitry, the haptic drive signal to control the at least one SMA actuator wire to deliver haptic feedback.

In a second approach of the present techniques, there is provided a method for delivering haptic feedback using a haptic assembly comprising a static component, a moveable component moveable relative to the static component, and at least one shape memory alloy (SMA) actuator wire for moving the moveable component to deliver haptic feedback, the method comprising: receiving an input signal requesting haptic feedback to be delivered; rendering a haptic profile defining instructions for driving the at least one SMA actuator wire; generating a haptic drive signal using the rendered haptic profile; and transmitting the haptic drive signal to control the at least one SMA actuator wire to deliver haptic feedback.

In a related approach of the present techniques, there is provided a non-transitory data carrier carrying processor control code to implement any of the methods, processes and techniques described herein.

Preferred features are set out in the appended dependent claims.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be implemented using multiple processors or control circuits. The present techniques may be adapted to run on, or integrated into, the operating system of an apparatus.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The apparatus may be any one of: a smartphone, a camera, a foldable smartphone, a foldable image capture device, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earbuds, earbuds, etc.), an audio device (e.g. headphones, headset, earphones, etc.), a security system, a gaming system, a gaming accessory (e.g. controller, headset, wearable controller, joystick, etc.), a robot or robotics device, a medical device (e.g. an endoscope), an augmented reality system or device, a virtual reality system or device, a wearable device (e.g. a watch, a smartphone, a fitness tracker, etc.), an autonomous vehicle (e.g. a driverless car), a vehicle, a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, and a near field communication (NFC) device. It will be understood that this is a non-exhaustive list of possible apparatus.

The present techniques may be used to provide haptic feedback in a large range of scenarios or for a large number of devices/systems. For example, haptic feedback may be provided in devices/systems that are suitable for: image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical use, surgical use, confirming an action/occurrence of an event, confirming mobile payments, confirming electronic payments, and confirming an action that took place using RFID or NFC, etc. The present techniques may be used to provide haptic feedback in scenarios where it is useful to have haptic feedback in combination with visual feedback, e.g. surgery, gaming, remote device control (e.g. remote control of drones), and payment confirmation (or transaction confirmation) where the payment was performed using an electronic device or NFC. The present techniques may be used to deliver haptic feedback to indicate that time has elapsed or a target has been reached—this could be useful for fitness trackers, for example. A low battery warning signal could be delivered using the present techniques. Thus, the present techniques can be used to provide haptic feedback whether or not a haptic button has been physically pressed.

The haptic feedback of the present techniques may be delivered by a suitable haptic assembly. In some cases, the haptic feedback may be delivered by a haptic assembly which comprises a physical button, e.g. a button on a smartphone or consumer electronics device. In some cases, the haptic feedback may be delivered by a haptic assembly which is provided within an apparatus but does not comprise a physical button. These figures are all very heavily biased towards an implementation with a physical button. For example, haptic assemblies may be provided below/behind a touchscreen, such that haptic feedback may be delivered when a user presses/touches the screen. In this case, there is no visible or physical button. In the following, the term "button" is used to generally mean a point or region on an apparatus where haptic feedback may be felt/delivered.

Implementations of the present techniques will now be described, by way of example only, with reference to the accompanying drawings, in which.

Broadly speaking, embodiments of the present techniques provide techniques for generating haptic feedback or haptic sensations, and in particular, techniques for outputting haptic feedback which varies depending on the input. A haptic feedback assembly may be incorporated into any device in which it may be useful to provide a user of the device with haptic feedback. Haptic feedback may be provided to confirm a user action (e.g. to acknowledge a button press), to indicate what action a user is performing (e.g. typing, scrolling, making a selection), or to enhance user experience (e.g. when playing a game or operating an 'app' on a smartphone). For example, haptic feedback assemblies may be incorporated into an electronic device or a consumer electronics device, such as a computer, laptop, portable computing device, smartphone, computer keyboard, gaming system, portable gaming device, gaming equipment/accessory (e.g. controllers, wearable controllers, etc.), medical device, user input device, etc. It will be understood that this is a non-limiting, non-exhaustive list of possible devices. Haptic feedback assemblies may be provided as standalone modules that may be incorporated into an electronic device during manufacture, and may be adapted to suit the device specifications such that it fits into a casing or external surface of the electronic device. Alternatively, some or all of the components of a haptic feedback assembly may be integrally formed in an electronic device. Each haptic feedback assembly may comprise electrical connections, which may couple the assembly to the device's processor(s), chip (s), motherboard, etc. It may be advantageous to use SMA actuator wire in an actuating mechanism that provides haptic feedback because of its high energy density, which means that an actuator comprising SMA actuator wire that is required to apply a particular force can be of a relatively small size.

Figure 1:
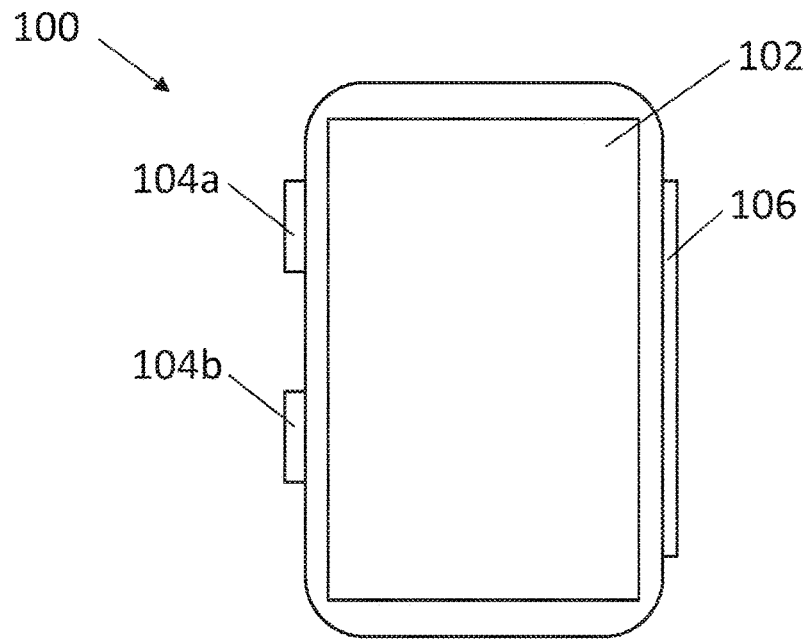
FIG. 1 shows a schematic diagram of an apparatus comprising one or more haptic buttons.

FIG. 1 shows a schematic diagram of an apparatus 100 comprising one or more haptic buttons. The apparatus 100 may be any electronic or electromechanical device. In the Figure, the apparatus 100 resembles a smartphone or tablet computing device, but this is a non-limiting illustration. However, it will be understood that apparatus 100 may be, among other things, a smartphone, a mobile computing device, a laptop, a tablet computing device, a gaming system, a gaming equipment/accessory (e.g. a hand-held controller, wearable controller, etc.), an augmented or virtual reality system, an augmented or virtual reality device, a wearable device, an autonomous vehicle (e.g. a driverless car), or a vehicle (e.g. a car, an aircraft, a spacecraft, a submersible vessel, etc.). The apparatus 100 may comprise a user interface 102, such as, for example, a display screen or a touchscreen.

The apparatus 100 may comprise one or more buttons 104a-b, 106 to receive user input/actions and/or to enable user control of the apparatus. The buttons 104a-b, 106 are shown as protruding along edges of the apparatus 100, but it will be understood that the buttons may be provided anywhere on the apparatus. For example, if the apparatus 100 is a smartphone, one or more buttons may be provided along any edge of the smartphone, on the front face (screenside) of the smartphone, and/or on the back face of the smartphone. Furthermore, it will be understood that the buttons 104a-b, 106 may not protrude from the apparatus 100, but may be substantially flush with or integrated into a surface of the apparatus. In embodiments, one or more buttons of the apparatus 100 may not be visible to a human user, as the various components of the button (e.g. touch detection mechanism, haptic feedback delivery mechanism, etc. may be located below a surface or edge of the apparatus 100 or integrated into a casing of the apparatus 100. The button may not be pressable—in some cases, the button may be touch-sensitive, such that a force (or a high force) is not required to engage or activate the button. This may be the case if the button is operated using sliding or scrolling gestures.

One or more of the buttons of apparatus 100 may be a haptic button, that is, a button capable of delivering haptic feedback to a user of the apparatus 100. Buttons 104a and 104b are small, discrete buttons on a surface of the apparatus 100, while button 106 is a long button or touch-sensitive area on a surface of the apparatus 100.

If any of buttons 104a-b are haptic buttons, the button may comprise a dedicated haptic assembly for generating localised haptic feedback.

If button 106 is a haptic button, the button may have one or more dedicated haptic assemblies for generating localised haptic feedback. For example, button 106 may have a single haptic assembly provided at a position along the button (e.g. in the centre of the button)—in this case, the haptic feedback may feel the strongest at the point on the button 106 located directly over/above the haptic assembly, and may feel less strong further away from this point. Alternatively, button 106 may have two or more haptic assemblies distributed (equally or otherwise) along the length of the button. In this case, the long button 106 may be used to provide haptic feedback in at least two different ways. For example, the long button 106 may be used to provide haptic feedback using one of the haptic assemblies. The haptic assembly that generates the haptic feedback may be located below or in the vicinity of the point on the button 106 that a user presses/touches, or may be located further away from this point. In another example, the long button 106 may be used by a user to scroll or swipe, and haptic feedback may be provided by each haptic assembly depending on where the user touches/presses the button at a given time. That is, a specific haptic assembly may be activated as the user swipes along the button in the vicinity of the haptic assembly and deactivated when the user swipes along the button further away from that haptic assembly. If the user is swiping along long button 106 to, for example, increase the volume of some audio output, then the 'strength' of the haptic feedback may increase as the user swipes. For example, the 'strength' of the haptic feedback provided by a first haptic assembly (which corresponds to a lower volume selection) may be lower than the 'strength' of the haptic feedback provided by a second haptic assembly (which corresponds to a higher volume selection).

Figure 2:
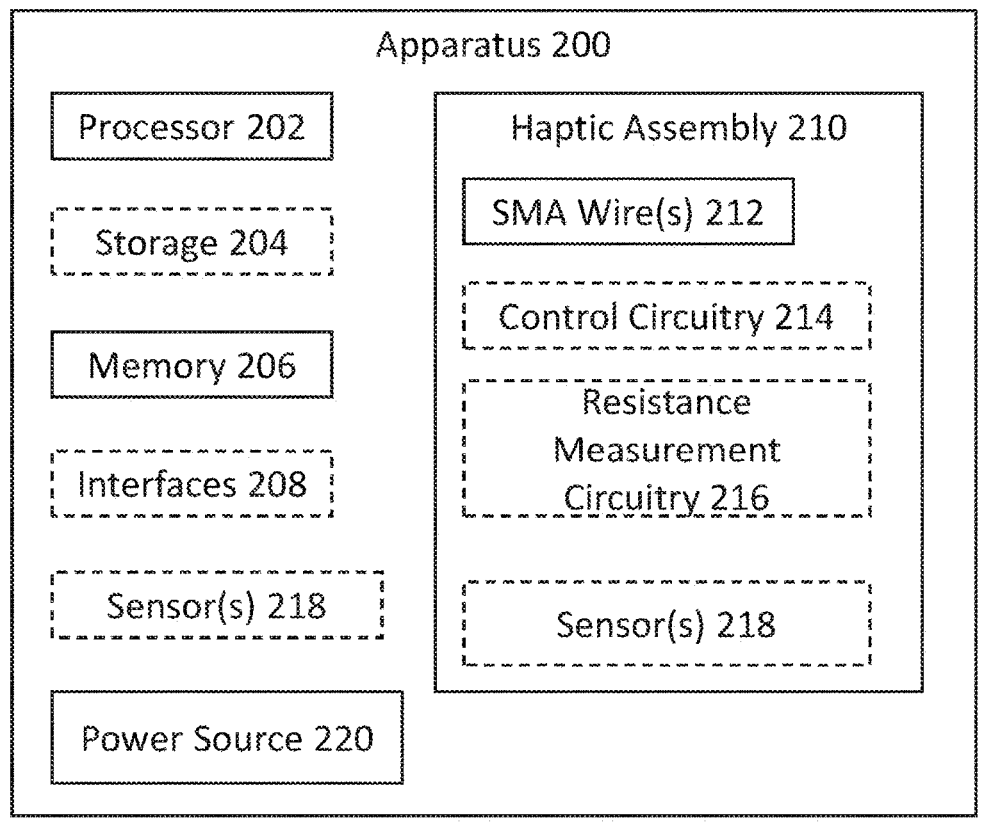
FIG. 2 is a schematic block diagram of an apparatus for delivering haptic feedback, such as the apparatus of FIG. 1.

FIG. 2 is a schematic block diagram of an apparatus 200 that is able to provide haptic feedback, such as the apparatus of FIG. 1. As above, apparatus 200 may be a smartphone, a mobile computing device, a laptop, a tablet computing device, a gaming system, a gaming equipment/accessory (e.g. a hand-held controller, wearable controller, etc.), an augmented or virtual reality system, an augmented or virtual reality device, a wearable device, or a vehicle (e.g. a car, an aircraft, a spacecraft, a submersible vessel, etc.).

The apparatus 200 comprises at least one haptic assembly 210 to generate haptic feedback. As mentioned above, the haptic assembly 210 may not be associated with or comprise a physical button that is visible to a user. In embodiments, the haptic assembly 210 may comprise a piston or button which provides haptic feedback when operated.

In particular embodiments, the or each haptic assembly 210 may comprise a mechanism to move a button of the apparatus in a lateral direction with respect to the contact by the user. Example mechanisms for doing so are described in International Patent Publication WO2018/046937 and United Kingdom Patent Publication No. GB2551657, which are both incorporated herein in their entirety. Additionally or alternatively, the or each haptic assembly 210 may comprise a mechanism to move a button of the apparatus in a direction that is normal to a contact surface of the button (and a surface of the apparatus 200 in which the button is incorporated). Example mechanisms for doing so are described in United Kingdom Patent Application Nos. GB1803084.1 and GB1813008.8, which are both incorporated herein in their entirety.

The or each haptic assembly 210 comprises at least one shape memory alloy (SMA) actuator wire 212.

The or each haptic assembly 210 may optionally comprise control circuitry 214 to control the SMA actuator wire(s) 212. In other words, a dedicated control circuitry 214 may be used to individually control a particular haptic assembly 210 (i.e. one control circuitry 214 controls one haptic assembly 210), or single control circuitry 214 may be used to control multiple haptic assemblies 210 (i.e. one control circuitry 214 controls many haptic assemblies 210). In some embodiments, the control of the SMA actuator wire(s) 212 may be performed using processor(s) 202 or control circuitry which is external to the haptic assembly 210.

In embodiments, as described in United Kingdom Patent Application No. GB1813008.8, haptic assembly 210 may comprise a button capable of moving along a first axis of the assembly and at least one intermediate moveable element in contact with the button. The at least one intermediate moveable element is moveable in a plane defined by the first axis and a second axis, the second axis being perpendicular to the first axis. The at least one intermediate moveable element is arranged to drive movement of the button along the first axis. The haptic assembly 210 may comprise at least one SMA actuator wire coupled to the at least one intermediate moveable element and arranged to, on contraction, move the intermediate moveable element in the plane.

Alternatively, as described in United Kingdom Patent Application No. GB1813008.8, the haptic assembly 210 may comprise a button moveable along a first axis, and at least one intermediate moveable element in contact with the button and rotatable about a second axis that is parallel to the first axis. In this case, the at least one intermediate moveable element is also arranged to drive movement of the button along the first axis. The haptic assembly 210 may comprise at least one SMA actuator wire coupled to the at least one intermediate moveable element and arranged to, on contraction, rotate the intermediate moveable element about the second axis.

It will be understood that these two examples of haptic assemblies are merely illustrative, non-limiting examples, and the techniques for delivering haptic feedback described herein may be used with any type or arrangement of haptic assembly. In both examples, the moveable elements of the haptic assemblies may be provided as physical buttons that a user is able to engage with, or the moveable elements may be 'hidden', e.g. below a surface of the apparatus or below/behind a screen.

The or each haptic assembly 210 may optionally comprise resistance measurement circuitry 216 to measure the resistance of each SMA actuator wire 212 (to e.g. determine a state of the SMA actuator wire). There may be dedicated resistance measurement circuitry 216 to measure the resistance of each SMA actuator wire 212 of an individual haptic assembly 210, or one resistance measurement circuitry 216 for multiple haptic assemblies 210.

The apparatus 200 may comprise at least one processor 202 that is coupled to the or each haptic assembly 210. A single processor 202 may be used to control multiple haptic assemblies 210, or a dedicated processor 202 may be used to control an individual haptic assembly 210. In embodiments, the processor(s) 202 may be used to implement other functions of the apparatus 100. The or each processor 202 may comprise processing logic to process data (e.g. data received from any sensors). The processor(s) 202 may be a microcontroller or microprocessor. The processor(s) 202 may be coupled to at least one memory 206. Memory 206 may comprise working memory, and program memory storing computer program code to implement some or all of the processes described herein to generate haptic feedback. The program memory of memory 206 may be used for buffering data while executing computer program code.

Apparatus 200 may optionally comprise one or more interfaces 208, such as a conventional computer screen/display screen, keyboard (virtual or physical), touch screens/touch sensors, mouse and/or other interfaces such as a network interface and software interfaces. Interfaces 208 may comprise a user interface such as a graphical user interface (GUI), touch screen, microphone, voice/speech recognition interface, physical or virtual buttons. Interaction with the interfaces 208 may be used to generate a command that haptic feedback is to be generated.

Apparatus 200 may optionally comprise a database or storage 204 to store, for example, any data collected by any sensors 218, and/or to store any data that may be used to generate a haptic feedback. For example, storage 204 may store one or more haptic feedback profiles and/or one or more look-up tables that indicate how the haptic feedback profiles may need to be adjusted to take into account environmental factors (e.g. temperature, state of the SMA actuator wire(s), humidity, etc.) Alternatively, such data and look-up table(s) may be stored in memory 206.

Apparatus 200 may optionally comprise at least one sensor 218. The sensor(s) 218 may be provided in the apparatus, and the output of the sensor(s) may be used to control the or each haptic assembly 210. Alternatively, the sensor(s) 218 may be provided in the or each haptic assembly 210. Alternatively, one or more sensors may be provided in the apparatus 200, and one or more sensors may be provided in the or each haptic assembly 210. Wherever sensor 218 is located, the sensor may be a temperature sensor (e.g. a thermistor), a humidity sensor, a touch sensor (e.g. capacitive sensor, force sensor, contact sensor, etc.), an accelerometer, or a gyroscope. In a particular, non-limiting example, a temperature sensor may be provided in apparatus 200, while a force sensor may be provided in the or each haptic assembly 210.

Apparatus 200 may comprise a power source 220, e.g. a battery/rechargeable battery. The power source 220 may be used to power each haptic assembly 210. The power source 220 may also be used to supply power to other components of the apparatus 200, e.g. the processor 202 and interfaces 208. Alternatively, the apparatus 200 may comprise multiple power sources 220.

Figure 3:
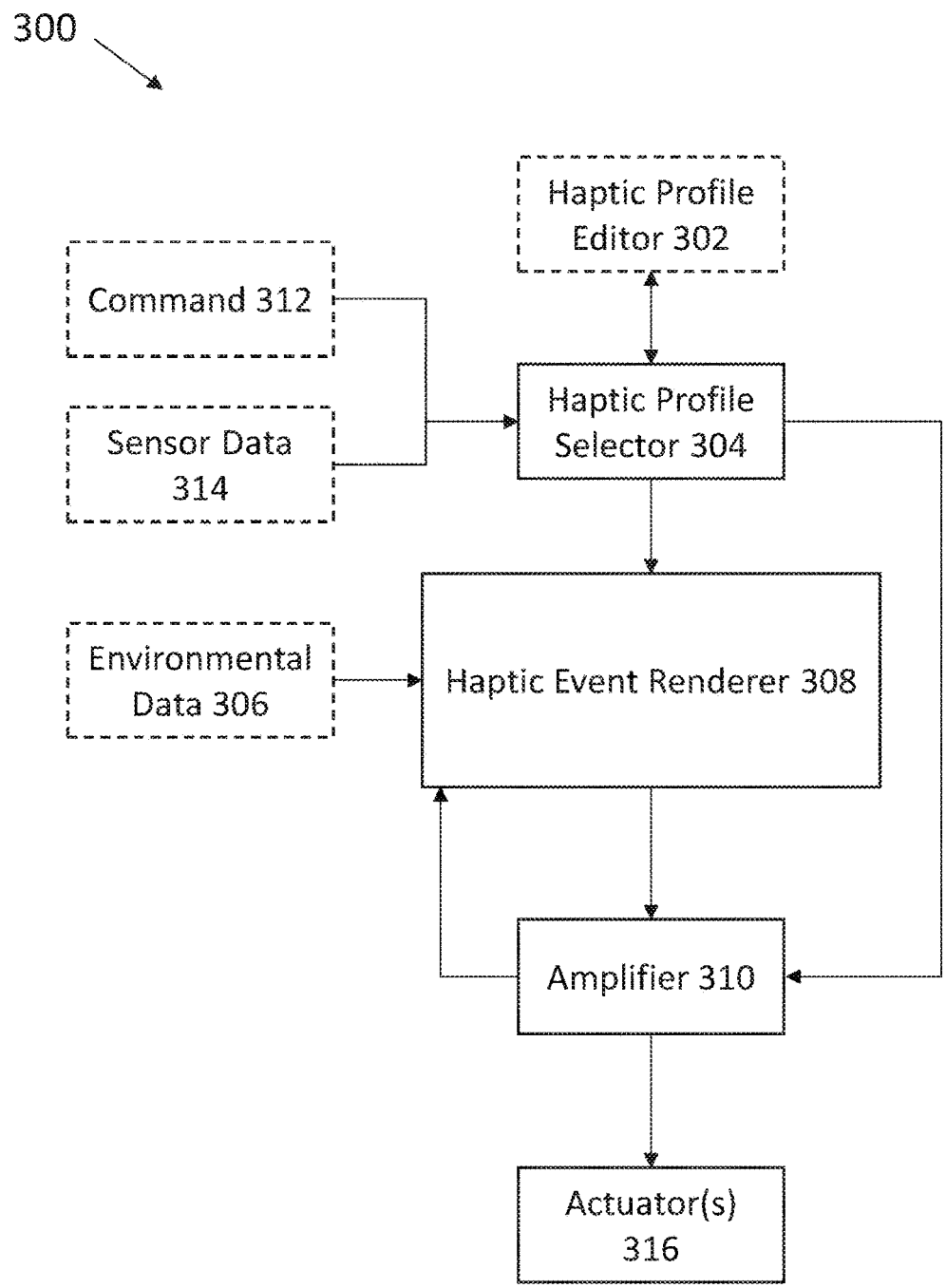
FIG. 3 is a schematic diagram of a system to generate haptic feedback.

FIG. 3 is a schematic diagram of an example system 300 to generate haptic feedback. The system 300 may be considered a haptic feedback rendering system. Generally speaking, the output of a haptic assembly which uses an actuator (e.g. SMA wire(s)) to deliver the haptic sensation may depend on various environmental factors, such as the age of the haptic assembly, number of uses or frequency of use, when it was last used, etc., as well as the technical specification of the haptic assembly (e.g. the diameter of the SMA wires, the number of SMA wires, the resistance of the SMA wires, etc.). The environmental factors and/or technical specification may cause the output haptic sensation delivered by the haptic assembly to differ or deviate from a desired output. (In the following, the term "environmental factors" is used as shorthand to generally mean environmental factors and technical specification). For example, the strength of the haptic sensation may decrease over time due to normal wear-and-tear of the haptic assembly. This may be problematic because the user experience may diminish over time. Another problem with existing haptic feedback systems is that they typically output limited types of haptic sensation. For example, some systems may only output a buzz sensation, regardless of what user action has been performed (e.g. button press, typing, scrolling, selecting, etc.). However, it may be desirable to output different types of haptic sensation such that, for instance, different user actions are associated with different types of haptic sensation. This may enhance the user experience. Similarly, it may be desirable to allow a user to customise the haptic sensation delivered for different types of events or user actions. The present techniques provide solutions to these problems, by enabling environmental factors to be taken into account when delivering haptic feedback such that the feeling of the haptic sensation/vibration may vary for different events or user actions.

In the present techniques, and as mentioned above, a "haptic profile" is a description of a particular type of haptic sensation. Generally, the term "haptic profile" is used herein to mean any description, definition or way of describing/defining a particular haptic sensation that is to be delivered by an apparatus (such as apparatus 100 or 200). In embodiments, the definition or description may be apparatus-agnostic. In other words, the definition/description may not depend on the technical specification of the apparatus or of the haptic assembly used to deliver haptic feedback. In this case, the haptic profile may be modified before it is used to deliver haptic feedback to take into account the technical specification or capabilities of the haptic assembly or apparatus. Alternatively, the definition/description may depend on the technical specification of the apparatus or haptic assembly.

In embodiments of the present techniques, a haptic profile may be defined using one or more "primitives". The term "primitive" is used herein to mean a base or root value which is used to define a haptic profile, but which itself is not derived from another value. One or more of the following primitives may be used to define a haptic profile:

intensity—this primitive value indicates the width of a pulse used to deliver a haptic sensation, or may indicate by how much a haptic button may be displaced/moved to deliver a particular haptic sensation.

More specifically, intensity may be defined as a percentage of pulse duration which would, given a particular power setting, result in the haptic actuator reaching its maximum stroke value. For example, a 5V setting might require a square wave of 8 ms duration to be delivered to reach maximum. In this case, a single pulse at 75% intensity indicates a square wave of 6 ms duration;

number of pulses—this primitive value indicates the number of pulses/instances of motion needed to deliver a particular haptic sensation;

tempo—this primitive value indicates the time between the end of one pulse and the start of the next pulse in a pulse sequence or train;

pitch—this primitive value indicates the power to be applied during a pulse to deliver a particular haptic sensation, where a higher power results in a higher pitch.

Thus, each haptic profile may be defined using one or more of these primitives. In particular embodiments, a haptic profile may be built using the pulse intensity, duration and number of pulses primitives, and the primitive defining the pitch (i.e. power or energy) may be optional. A primitive may be a fixed constant, a variable, or may be defined by a mathematical function. The primitive values are not dependent upon the apparatus or haptic assembly used to deliver haptic feedback. The primitives are described in more detail below with reference to FIG. 4.

In the present techniques, a haptic profile may be selected and used to generate a particular desired haptic sensation. System 300 comprises a haptic profile selector 304 to select a suitable haptic profile for a desired haptic sensation. In embodiments, the haptic profile selector 304 may select a haptic profile from a set of haptic profiles. Alternatively, the haptic profile selector 304 may generate a haptic profile based on one or more primitives that produce the desired haptic sensation. The haptic profile selector 304 may be triggered or initiated based on any type of input or trigger. An example trigger is a command 312. Command 312 may be a command that arises from the implementation of a particular program or application within the apparatus in which the system 300 is provided. Another example trigger is sensor data 314. Sensor data 314 may be received from a button of the apparatus which has been pressed by a user. In other words, a button press may be detected using a force sensor, for example, and the sensed force may trigger the haptic profile selector 304 to select a haptic profile. In embodiments, the magnitude of the force may also be used to select a haptic profile.

Optionally, system 300 may comprise a haptic profile editor 302. The haptic profile editor 302 may enable particular types of haptic event to be generated either in advance of haptic feedback delivery or when haptic feedback has been requested. In embodiments, it may be possible for a user to define the type(s) of haptic feedback or sensation, which may be performed using haptic profile editor 302. The haptic profile editor 302 may be provided as a graphical user interface which allows a user to define a haptic event. In one example, the haptic event may simply be a type of haptic sensation, as defined by a haptic profile. In this case, the user interface of haptic profile editor 302 may enable a user to select the values of one or more primitives. For example, the user interface may comprise slider bars for one or more primitives which the user is allowed to modify or select—the slider bars may allow the user to select a value for a primitive between some minimum and maximum values. In another example, the user interface may comprise drop-down lists of predefined values for one or more primitives—the user may select a value for a primitive from the drop-down list of options. In embodiments, one or more of the primitives may not be modified by a user. For example, it may not be desirable to allow a user to adjust the amount of power of the pulses used to drive the at least one SMA actuator wire of a haptic assembly.

System 300 may comprise a haptic event renderer 308. When a haptic profile 304 has been selected, it may be sent/transmitted to the haptic event renderer 308. The haptic event renderer 308 may be used to generate a haptic drive signal using the received haptic profile. The haptic drive signal is used to control the at least one SMA actuator wire of the haptic assembly to deliver haptic feedback. The haptic event renderer 308 may in embodiments simply generate a drive signal for the SMA actuator wire(s) based only on the haptic profile selected by the haptic profile selector 304. In other embodiments, the haptic event renderer 308 may take into account environmental data or factors 306 as well as the selected haptic profile to generate the drive signal(s). The environmental data 306 may be, for example:

- the current temperature in the vicinity of the SMA actuator wire(s), or of the environment outside the apparatus, as measured, estimated or derived;
- the state of the SMA actuator wire(s);
- the history of the haptic assembly, e.g. the time since it was last used to deliver haptic feedback;
- the age of the haptic assembly, e.g. the total number of times it has been used to deliver haptic feedback, or how old the material is (which may give rise to creep);
- the orientation and/or position of the apparatus used to deliver haptic feedback;
- the resistance value of the SMA actuator wire(s), as measured, estimated or derived;
- the humidity in the vicinity of the SMA actuator wire(s) or of the environment outside the apparatus; and
- the time between presses of a haptic button;
- the size of the actuator (i.e. the volume of wire and/or resistance of the SMA actuator wire(s)).

It will be understood that these are just some examples of environmental data 306, and that this list is not an exhaustive list.

The haptic event renderer 308 may modify the haptic profile based on any received or input environmental data 306, in order to generate a drive signal for the SMA actuator wire(s). Some examples are now described.

Temperature: A haptic profile may have been defined for an apparatus that is being used in an environment that is at room temperature (e.g. 21° C.). However, the apparatus may be used in practice in environments having higher or lower temperatures. For example, the apparatus may be used outside during Winter or in countries with colder climates. The haptic assembly, and in particular, the SMA actuator wire(s), may operate differently in cooler/colder temperatures. For example, it may take longer, or may require more power, for an SMA actuator wire to contract at lower temperatures. Thus, the colder temperature may be taken into account by the haptic event renderer 308 to generate a drive signal which allows the same haptic sensation (as defined by the haptic profile) to be delivered. The haptic event renderer 308 may have access to the current temperature to achieve this—the current temperature may be stored in the apparatus, for example. The haptic event renderer 308 may keep aspects of the waveform defined by the haptic profile the same (such as the power (voltage or current), or the duration), but may change other characteristics of the waveform in order for the required haptic sensation to be delivered. Alternatively, the haptic event renderer 308 may adjust power (voltage or current) or duration. Alternatively, the haptic event renderer 308 may adjust the power, duration and/or other characteristics of the waveform. Alternatively, the haptic event renderer 308 may perform an additional action (e.g. pre-heating of the wire) ahead of rendering of the haptic profile.

State of the SMA actuator wire: In some cases, the current state of the SMA actuator wire may make it unsafe to deliver power to the wire. Thus, the haptic event renderer 308 may use the current state of the SMA actuator wire(s) to determine if it is safe to deliver power to the wire, unsafe, or safe to a certain extent. More generally, it is desirable to ensure that a maximum energy is not being exceeded, regardless of the history or current state of the SMA actuator wire, in order to prevent damage to the SMA actuator wire. A haptic profile may specify the energy to be delivered to an SMA actuator wire, but this may be based on some default SMA actuator wire specification (e.g. wire volume). The maximum power deliverable to wires that are thinner than the default SMA actuator wire may be lower, for example. Thus, the haptic event renderer 308 may use information about the SMA actuator wire itself to generate the drive signal for the wire. The haptic event renderer 308 may use a lookup table (which may be populated using experimental and/or model data) to determine whether it is safe to deliver the energy defined in the haptic profile. (In some cases, the safety level may be calculated/determined in real time/on-the-fly and a lookup table may not be used.) The lookup table may, for example, show the safe/allowable energies deliverable to wires at particular temperatures. Thus, the haptic event renderer 308 may generate a drive signal which has a lower energy than that defined by the haptic profile. In some cases, it may not be safe to deliver any energy to the SMA actuator wire, and the haptic event renderer 308 may not generate a drive signal. In this case, the haptic event renderer 308 may truncate a drive signal or pulse which is already being delivered, or omit a pulse of a drive signal, or cancel the drive signal entirely. I History of the haptic assembly: In some cases, the history of the haptic assembly may be used by the haptic event renderer 308 to generate a drive signal. For example, it may be desirable to limit the number of times a haptic button may be actuated in a particular period (e.g. per second or per minute), in order to prevent damage to the haptic button or the SMA wires. In another example, it may be desirable to have a minimum 'rest' period between actuations of the haptic button, or between pulses of a specific haptic sensation, in order to prevent damage to the haptic button or the SMA wires. The haptic event renderer 308 may determine when the last actuation occurred and then generate a drive signal which includes a delay to provide this 'rest' period. Similarly, the haptic event renderer 308 may adjust the time between pulses (as defined by the haptic profile) when generating a drive signal.

The age of the haptic assembly: The total number of times the haptic assembly has been used to deliver haptic feedback may be taken into account by haptic event renderer 308 when generating a drive signal. For example, the operation of one or more components of the haptic assembly may vary over time, such that it may be necessary to use a greater force to achieve the same haptic sensation as the haptic assembly ages. Thus, the haptic event renderer 308 may take into account the age of the haptic assembly (however this may be defined), when generating a drive signal.

The orientation and/or position of the apparatus used to deliver haptic feedback: An accelerometer or gyroscope may be used to determine the orientation and/or position of the apparatus, and the results may be used by the haptic event renderer 308 to generate a drive signal to deliver a particular haptic sensation.

The resistance value of the SMA actuator wire(s): In some cases, the resistance of the SMA actuator wire(s) may be measured or derived and the resistance value may be used by the haptic event renderer 308 when generating a drive signal. For example, a static resistance value may indicate how much power (or how much more power) can be safely applied to an SMA actuator wire. The resistance value may also indicate how much power is required for the SMA actuator wire to contract by an amount required to deliver the haptic sensation. This resistance value is considered to be a static resistance value.

In some cases, the drive signal may comprise driving an SMA actuator wire towards a target resistance value. In this case, a dynamic resistance measurement may be made, to determine if the target resistance has been reached or if the SMA wire needs to be driven further. However, if the maximum allowed/safe power is reached while this driving is taking place, then the haptic assembly may attempt to continually drive the SMA actuator wire regardless of the fact that the target resistance cannot be reached. In this case, the haptic event renderer 308 may adjust the drive signal during use (i.e. during delivery of a haptic sensation) to adjust the target resistance value. For example, the haptic event renderer 308 may aim to deliver a pulse of duration 5 ms, but if in this time, the required target resistance has not been reached, the haptic event renderer 308 may adjust the target and/or the pulse duration. (However, a significant adjustment may cause the haptic sensation to differ from the required haptic sensation. For example, if the pulse duration is lengthened, the haptic sensation may no longer feel like a soft buzz but may feel like a click instead).

Humidity: It may not be desirable to deliver a haptic sensation when the risk of condensation forming inside the haptic assembly is high. This may be the case if the ambient temperature is low, as powering the SMA actuator wire(s) causes the haptic assembly to heat up and may cause condensation to occur, which may cause shorting to occur. (The problem may also occur if the apparatus has been in an environment which is <° 0C and is then taken into an environment which is >° 0C—condensation may occur in this case even when the SMA actuator wire(s) is not powered). The condensation may cause damage to components of the haptic assembly. Thus, the haptic event renderer 308 may not generate a drive signal when the humidity inside the haptic assembly is above some threshold.

Time between presses of a haptic button: The haptic event renderer 308 may not generate a drive signal whenever the haptic profile selector 304 selects a haptic profile (in response to a request for haptic feedback to be delivered). For example, if a haptic button is pressed more than N times in a particular duration D, then the haptic event renderer 308 may ignore the most recent button press (e.g. the most recent selected haptic profile received from the haptic profile selector 304). Thus, in some cases, system 300 may be a frequency-limited system. In embodiments, depending on the haptic profile and information about the previous haptic profile used to deliver haptic feedback recently, the allowable frequency may change.

The system 300 may comprise an amplifier 310. The amplifier 310 may be used to deal with any issues of high instantaneous power and/or the capability of the actuator.

When the drive signal has been generated, it is transmitted to control circuitry and used to control the at least one SMA actuator wire of actuator 316 to deliver haptic feedback.

In embodiments, system 300 may be entirely implemented in an apparatus capable of delivering haptic feedback (e.g. apparatus 100, 200). Alternatively, particular functions of the system 300 may be distributed across two or more devices. For example, in embodiments, haptic profile editor 302 may be provided off the apparatus, and the haptic profiles generated there may be uploaded to the apparatus.

Figure 4:
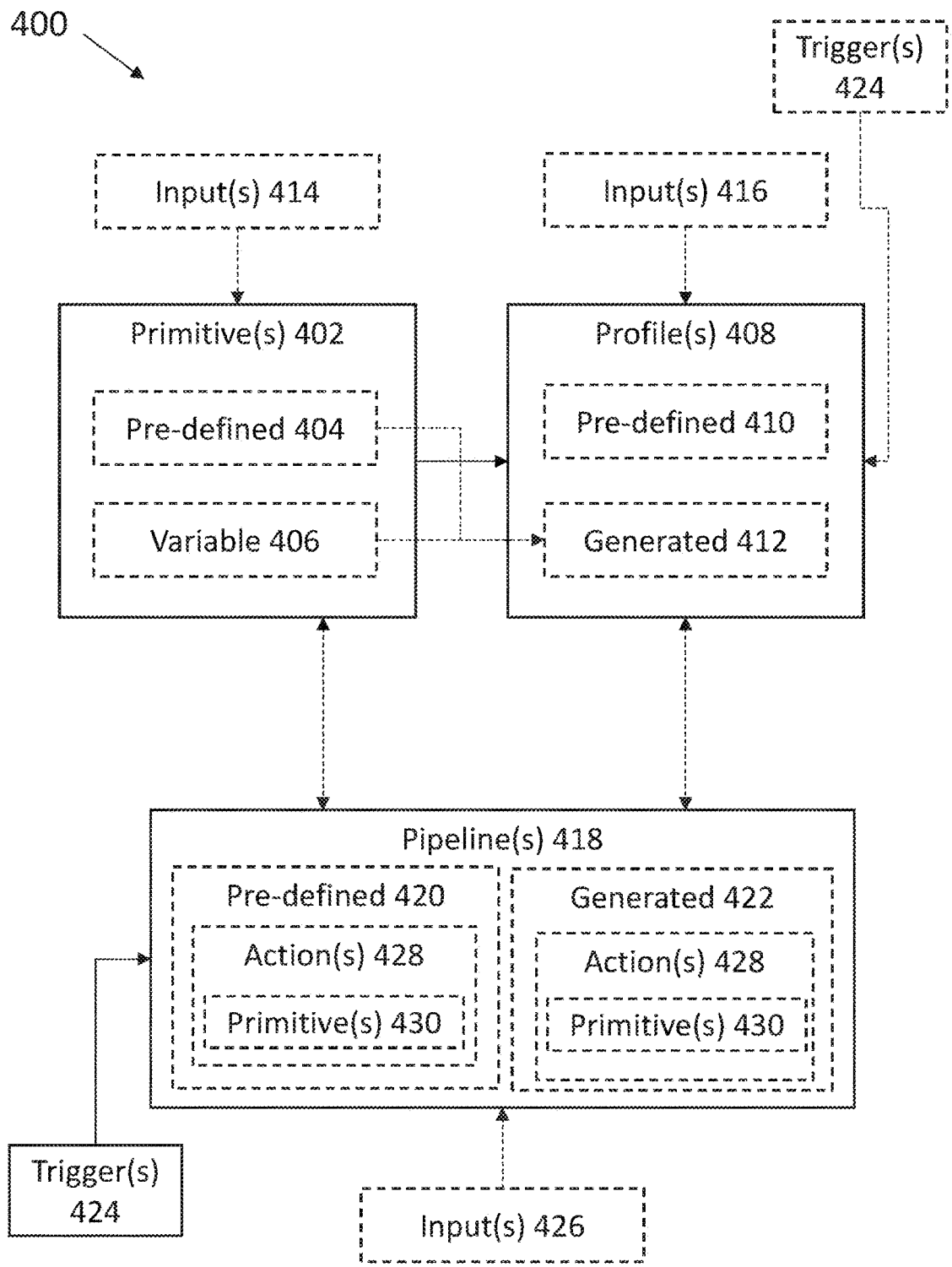
FIG. 4 is a schematic block diagram of a system architecture for generating haptic feedback.

FIG. 4 is a schematic block diagram of a system architecture 400 for generating haptic feedback. As mentioned above, haptic feedback is generated and delivered using haptic profiles 408 and/or primitives 402. Haptic feedback may be delivered as part of a pipeline 418 (see definition above). The system architecture 400 will now be explained in more detail.

When a request for haptic feedback is received (as explained with reference to FIG. 3), a haptic profile 408 may be rendered. The rendered haptic profile defines instructions for driving at least one SMA actuator wire. The haptic profile may be rendered by selecting a profile from a set of pre-defined haptic profiles 410 or may be rendered by generating a generated profile 412 on-the-fly (i.e. during the process to generate and deliver haptic feedback). In embodiments, the rendering process may comprise rendering a haptic profile based only on the received instructions/request to deliver haptic feedback. In embodiments, the rendering process may also comprise taking into account additional information, such as the environmental data 306 described above.

Pre-defined profiles: One or more pre-defined haptic profiles 410 may be stored in the system 400 and accessible by the haptic profile selector 304. The selection may be made based on one or more factors. For example, the selection may be based on:
  which button or haptic button has been pressed;
  why the user has pressed the button (e.g. to make a selection, as part of a game, to change the volume of audio output, to scroll, etc.);
  environmental data;
  the force with which the button/haptic button is pressed;
  a software event; and/or
  a message, trigger or other received communication (e.g. communication or message received from another device or source).

It will be understood that these are just some of the factors that may be used to decide which haptic profile to select from the set of pre-defined haptic profiles 410.

When the haptic event renderer 308 uses a pre-defined haptic profile 410 to generate a drive signal for SMA actuator wire(s), the haptic event renderer 308 may use only the content of the selected pre-defined haptic profile 410 to do so. Alternatively, the haptic event renderer 308 may use one or more inputs 416 (e.g. environmental data), in combination with the selected pre-defined haptic profile 410, to generate a drive signal. This may comprise modifying aspects of the selected pre-defined haptic profile 410.

Generated profiles: The haptic event renderer 308 may generate a generated haptic profile 412 based on the received instructions/request for haptic feedback. The haptic event renderer 308 may in some cases only use the received instructions to generate the generated haptic profile 412. Alternatively, the haptic event renderer 308 may use one or more inputs 416 (e.g. environmental data), in combination with the received instructions/request, to generate a drive signal. In each case, the haptic event renderer 308 uses one or more primitives 402 to build the generated profile 412. The primitives 402 may be pre-defined primitives 404 or variable primitives 406, or a combination of the two.

As explained above, a haptic profile may be defined using one or more primitives. System 400 may contain a store of one or more pre-defined primitives 404. The pre-defined primitives 404 may be fixed constants. One or more primitives may be variable primitives 406. The variable primitives 406 may vary depending on one or more inputs 414 (e.g. environmental data). The pre-defined primitives 404 and variable primitives 406 may include one or more of the above described primitives, i.e. intensity, number of pulses, tempo and pitch. In embodiments, it may be desirable to prevent a primitive from changing. For example, it may not be desirable to change the pitch because doing so may cause damage to the system.

Thus, the generated haptic profile 412 could be built using pre-defined or fixed primitives 402 and/or variable primitives 406.

Haptic feedback may be delivered as part of a pipeline and therefore, system 400 may comprise one or more pipelines 418, or at least the capability to construct a pipeline. The term "pipeline" is used herein to mean a list or sequence of events or actions. The events/actions may need to take place in a specific order, and the order may be defined in a pipeline. For example, a pipeline may specify a series of events A, B and C, and may specify that A must take place before B, and B must take place from C. In addition to the events/actions, a pipeline may contain conditional statements. The conditional statements may be 'if this then that' (IFTTT) type statements or 'if else' type statements. For example, a pipeline may specify "if X, then action A must take place, or if Y, then ignore action A and start with action B", where X and Y are particular conditions. The conditions may be, for example, the value of some environmental data (e.g. the current temperature, resistance value of the SMA wire(s), etc.). Additionally or alternatively, the conditions may be based on other programs, software, applications or actions being taken or run on the apparatus on which the haptic feedback is going to be delivered. For example, the condition may be whether or not audio is being output from the apparatus.

A pipeline 418 may be a pre-defined pipeline 420, or may be a generated pipeline 422 that is generated on-the-fly (e.g. as part of the process to deliver haptic feedback). Each pre-defined pipeline 420 and each generated pipeline 422 comprises at least one action 428. The action(s) 428 may be commands or may be associated with commands for implementing the action 428. For example, if an action 428 is to "output audio", the action 428 may be associated with commands, instructions or scripts to implement the action. (For example, the action may raise a trigger within the apparatus and the apparatus may then, for example, check a memory location to determine what action to perform (e.g. play audio)). Similarly, if an action 428 is to "deliver haptic feedback", the action 428 may be associated with instructions outlining where a drive signal needs to be sent in order for haptic feedback to be delivered (e.g. to each SMA actuator wire or to a particular SMA actuator wire, or to control circuitry used to control the haptic assembly, etc.).

In embodiments, the pre-defined pipeline 420 and/or generated pipeline 422 may comprise one or more primitives 430. The primitives may be pre-defined and/or variable primitives, as described above. The primitives 430 may be provided as a type of action 428. For example, if a pipeline specifies a sequence of actions 428 A, B, C and D, then action A may be a primitive or set of primitives 430 (or an action to fetch one or more primitives from memory), action B may be a command to build a haptic profile using action A, action C may be to generate a drive signal using the haptic profile, and action D may be to apply the drive signal to deliver haptic feedback. More generally, each action 428 may be associated with commands, scripts or other instructions on how to implement the action 428 or how to complete the step associated with action 428. The primitive 430 may, in some cases, simply be or comprise a pointer to the location of the primitive value itself. That is, primitive 430 may be a pointer to the location in memory of the primitive value.

A trigger 424 may trigger the initiation of a pipeline 418. Trigger 424 may be instructions or an input signal requesting haptic feedback to be delivered. The trigger 424 may initiate the selection of a pre-defined pipeline 420, or may cause the generation of a generated pipeline 422. Optionally, one or more inputs 426 (e.g. environmental data) may also be used to select a pipeline or to generate a pipeline. The input(s) 426 may be used to modify a selected pre-defined pipeline 420. Regardless of whether it is pre-defined, modified, or generated, the pipeline comprises one or more actions 428, where an action 428 may be a primitive 430. The primitive(s) 430 may be a fixed/pre-defined primitive, or may be a variable primitive which may vary depending on one or more inputs 426.

Regardless of whether it is pre-defined or generated, one of the actions 428 of a pipeline 418 may be to select or build a haptic profile 408. A haptic profile may be selected from the set of pre-defined haptic profiles 410, using the information in the trigger 424 and/or input(s) 426. Alternatively, a haptic profile may be generated 412, using the information in the trigger 424 and/or input(s) 426. The selected pre-defined haptic profile 410 may be modified, or the generated profile 412 may be built, using one or more inputs 416

Thus, in the simplest case, every aspect of the system is pre-defined. In this case, a trigger may cause a pre-defined pipeline 420 to be initiated, where all the actions 428 of the pipeline are defined, as are the haptic profile(s) 408 and primitives 402 the pipeline may rely upon. A more complicated case is where every aspect of the system is generated on-the-fly. In this case, a trigger may cause a pipeline to be generated 422, and the haptic profile(s) 408 and primitives 402 that the pipeline needs to use are also generated or varied/modified on-the-fly. It will be appreciated that a large number of possibilities exist between these simple and complex cases.

In particular embodiments, the pipeline 418 may be optional. For example, if a pipeline 418 only contained an action 428 to deliver haptic feedback using a pre-defined haptic profile 410, then the pipeline may not be necessary. In this case, trigger 424 may directly initiate the selection of the pre-defined haptic profile 410.

The present techniques deliver haptic feedback using the system architecture described with reference to FIG. 4. Some examples of how haptic feedback may be delivered are now described with reference to FIGS. 5 to 17.

Figure 5:
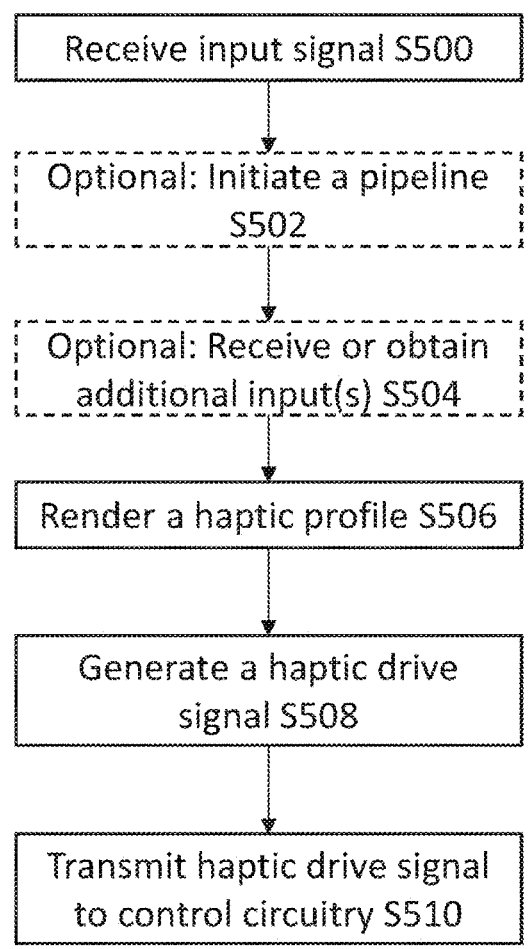
FIG. 5 is a flowchart of example steps to deliver haptic feedback.

FIG. 5 is a flowchart of example steps to deliver haptic feedback. The process begins by receiving an input signal (step S500). The input signal may be received by a processor 202 of apparatus 200 or a dedicated processor of the haptic assembly 210 of apparatus 200. The input signal may be triggered by a software process or event taking place in the apparatus, or by receipt of a message by a communication protocol of the apparatus. In some cases, the input signal may be triggered by detection of contact on a pressable button or touch-sensitive portion of the apparatus. The input signal may only be triggered if a minimum threshold capacitance is sensed, force is applied or displacement of the button occurs.

The input signal comprises a request for haptic feedback to be delivered. Responsive to receiving the input signal, the processor 202 renders a haptic profile defining instructions for driving the at least one SMA actuator wire 212 of the haptic assembly 210 (step S506). The haptic profile may be rendered by selecting a pre-defined haptic profile, modifying a pre-defined haptic profile, or generating a generated haptic profile, as described above. The processor generates a haptic drive signal using the rendered haptic profile (step S508), and transmits the generated haptic drive signal to control circuitry 214 to control the at least one SMA actuator wire 212 to deliver haptic feedback (step S510). The haptic drive signal may be a pulse width modulated (PWM) drive signal. A PWM drive signal may be particularly useful in cases where multiple haptic buttons are driven substantially simultaneously. (This may occur if the request for haptic feedback requires the haptic feedback to be delivered by two or more haptic buttons at the same, or substantially the same time). In other cases, the haptic drive signal may be a linear drive signal.

Optionally, the process may comprise initiating a pipeline in response to receiving the input signal (step S502), as described above.

Optionally, the process may comprise receiving, or obtaining, one or more additional inputs (step S504), which may be used to initiate, modify or cancel a pipeline and/or render a haptic profile, as described above.

Thus, the present techniques provide an apparatus for delivering haptic feedback, comprising: a static component; a moveable component moveable relative to the static component; at least one shape memory alloy (SMA) actuator wire for moving the moveable component to deliver haptic feedback; control circuitry for controlling the at least one SMA actuator wire; and at least one processor, communicatively coupled to the control circuitry, to: receive an input signal requesting haptic feedback to be delivered; render a haptic profile defining instructions for driving the at least one SMA actuator wire; generate a haptic drive signal using the rendered haptic profile; and transmit, to the control circuitry, the haptic drive signal to control the at least one SMA actuator wire to deliver haptic feedback.

The present techniques also provide a method for delivering haptic feedback using a haptic assembly comprising a static component, a moveable component moveable relative to the static component, and at least one shape memory alloy (SMA) actuator wire for moving the moveable component to deliver haptic feedback, the method comprising: receiving an input signal requesting haptic feedback to be delivered; rendering a haptic profile defining instructions for driving the at least one SMA actuator wire; generating a haptic drive signal using the rendered haptic profile; and transmitting the haptic drive signal to control the at least one SMA actuator wire to deliver haptic feedback.

At step S510 of the process of FIG. 5, a haptic drive signal is transmitted to control circuitry. There are a number of different types of haptic sensation, and the techniques to deliver these may involve different drive pulses or sequences of drive pulses. Three types of haptic sensation, and techniques to deliver them, are now described with reference to FIGS. 6 to 8. It will be understood that these are just some illustrative examples of haptic sensation. Furthermore, it will be understood that alternative techniques may be used to deliver the haptic sensations.

Figure 6:
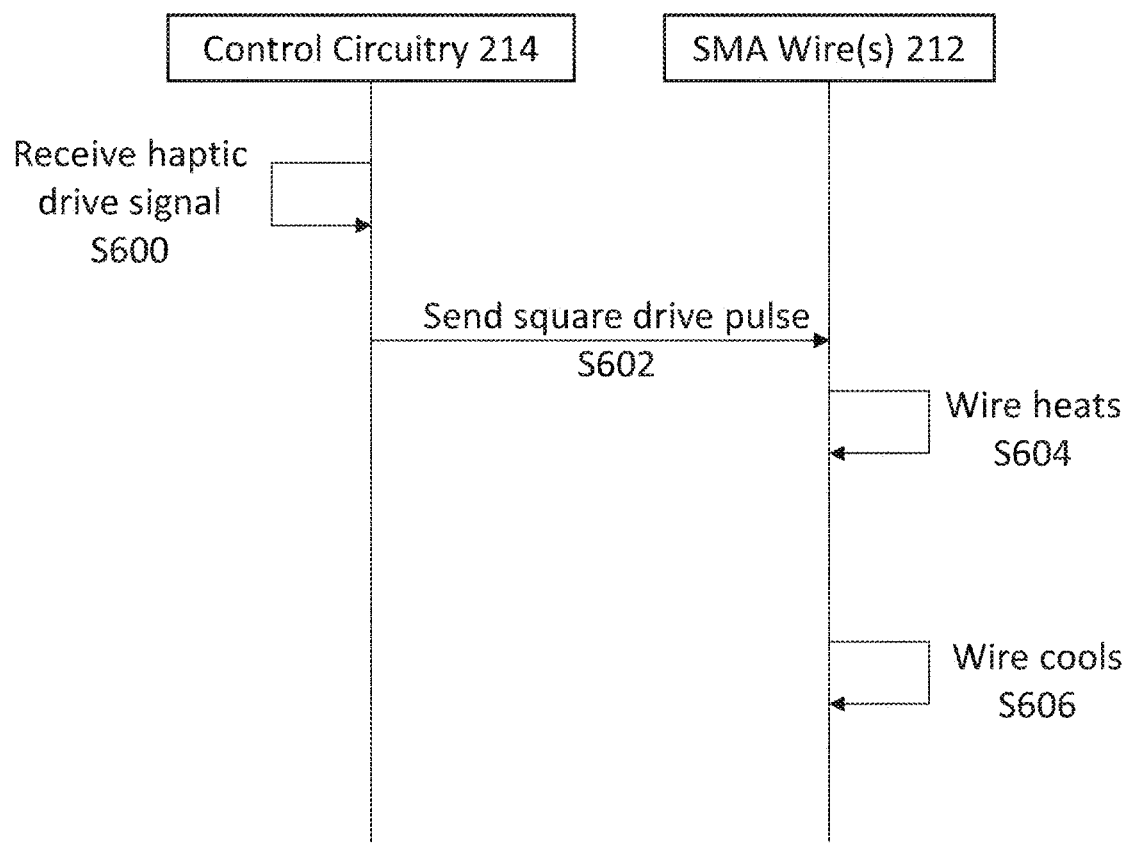
FIG. 6 is a schematic diagram of example steps to generate a haptic 'click' sensation.
Figure 6:
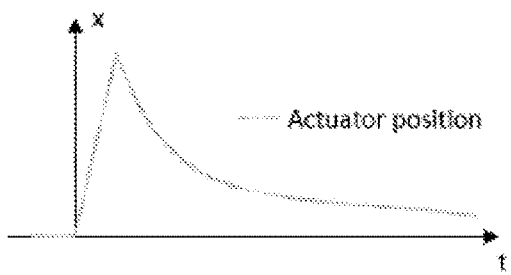

FIG. 6 is a schematic diagram of example steps to generate a haptic 'click' sensation. The sensation may feel like a discrete vibration or a quick movement, similar to a regular mechanical button. This may be the simplest haptic sensation to generate, as it is similar to turning something on and off once. The process begins when the control circuitry 214 receives a haptic drive signal to control the at least one SMA actuator wire 212 to deliver haptic feedback (step S600). The haptic drive signal comprises enough information for the control circuitry 214 to know how to control the at least one SMA actuator wire 212.

Responsive to receiving the haptic drive signal, the control circuitry 214 controls the at least one SMA actuator wire 212 using a square drive pulse (step S602). In embodiments, the control circuitry 214 may begin by using one long pulse to bring the SMA actuator wire 212 up to its operating temperature before delivering the square drive pulse for the haptic feedback. The square drive pulse causes the SMA wire(s) 212 to heat-up and contract (step S604). Contraction of the SMA wire(s) 212 causes the moveable component of the haptic assembly 212 to move. (The heating of the SMA actuator wire(s) 212 is substantially quicker than the cooling of the wires. The heating may typically take <10 ms, while cooling may take ~100 ms (for 36 μm wire) to ~500 ms (for 65 μm wire).) Eventually, the SMA wire(s) 212 cools down and lengthens (step S606) and the moveable component may return to an equilibrium or rest position. Biasing means (e.g. a return spring) may be used to return the moveable component to the equilibrium position. Alternatively, the finger force on the button of a haptic assembly 212 may act as a biasing means. The SMA wire(s) 212 goes through one heat and cool cycle to deliver this haptic sensation. The time taken for the moveable component to move and deliver the "click" sensation, and the strength of the sensation, may depend on properties of the square drive pulse, e.g. the amplitude and the length of the pulse. By way of example, the square drive pulse may deliver 2.5 W of power, 5 W of power or up to 10 W of power in 1 ms.

Figure 7:
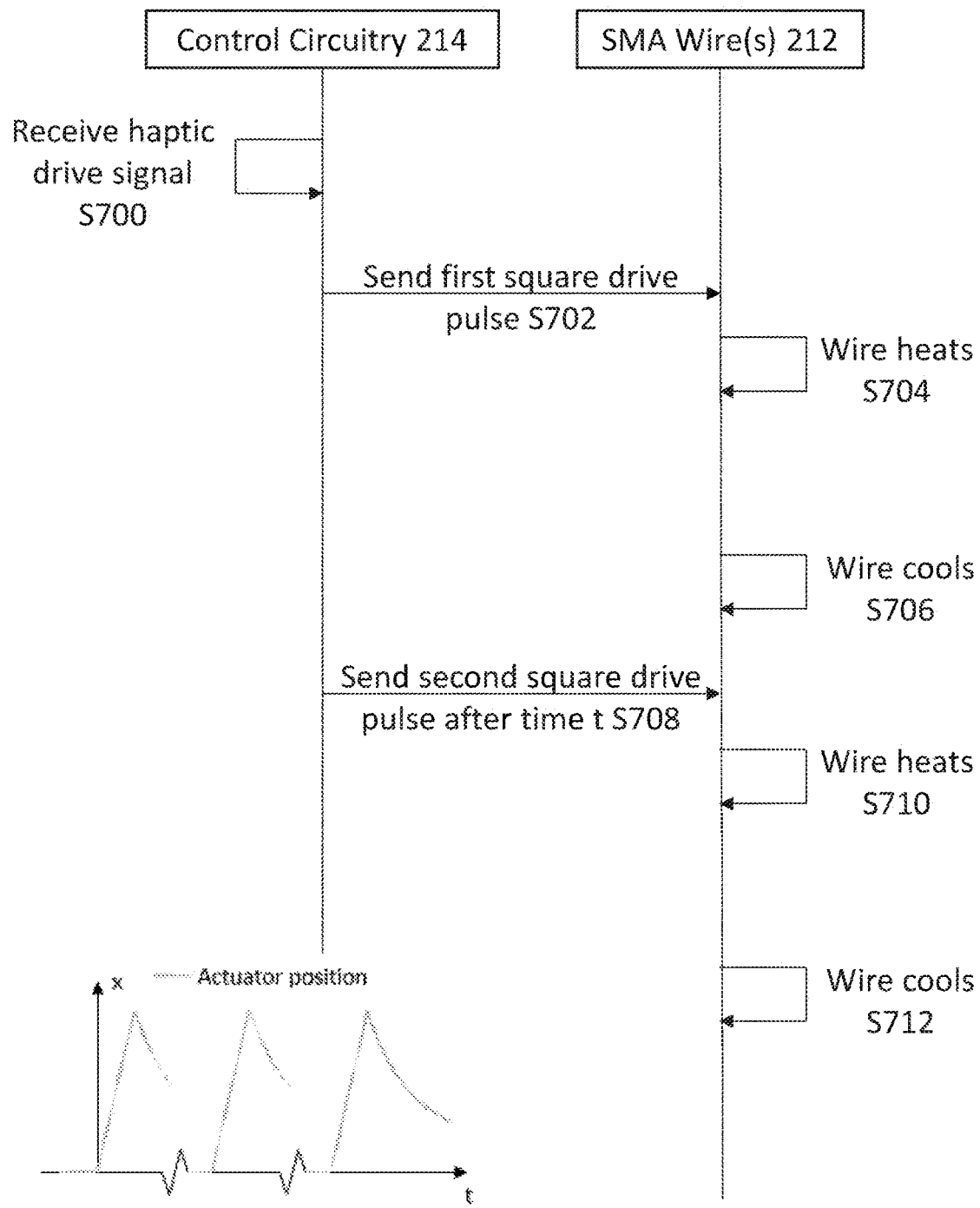
FIG. 7 is a schematic diagram of example steps to generate a haptic 'soft buzz' sensation.

FIG. 7 is a schematic diagram of example steps to generate a haptic 'soft buzz' sensation. The sensation may feel like a mild buzz or multiple short vibrations. The process begins when the control circuitry 214 receives a haptic drive signal to control the at least one SMA actuator wire 212 to deliver haptic feedback (step S700). The haptic drive signal comprises enough information for the control circuitry 214 to know how to control the at least one SMA actuator wire 212.

Responsive to receiving the haptic drive signal, the control circuitry 214 controls the at least one SMA actuator wire 212 using at least two identical drive pulses (e.g. square drive pulses), where adjacent drive pulses are separated by an equal predefined duration. In embodiments, the control circuitry 214 may begin by using one long pulse to bring the SMA actuator wire 212 up to its operating temperature before delivering the two drive pulses for the haptic feedback. Thus, at step S702, the control circuitry 214 sends a first drive pulse to the at least one SMA actuator wire 212. The first drive pulse causes the SMA wire(s) 212 to heat-up and contract (step S704). Contraction of the SMA wire(s) 212 causes the moveable component of the haptic assembly 212 to move. Eventually, the SMA wire(s) 212 cools down and lengthens (step S706) and the moveable component may return to an equilibrium or rest position. Biasing means (e.g. a return spring) may be used to return the moveable component to the equilibrium position. The control circuitry 214 sends a second drive pulse after a predefined duration or time t (step S708). The SMA wire(s) 212 heats-up and contracts (step S710) and then cools (step S712), as before. In some cases, more than two drive pulses may be used to generate the haptic sensation, and therefore, the control circuitry 214 may send further drive pulses. For the sake of simplicity, only two drive pulses are shown in FIG. 7. The time between the first and second drive pulses may be, for example, 0.1 ms. By way of example, a buzz sensation may be achieved by sending 10 or more identical pulses, each of duration 0.1 ms. The time taken for the moveable component to move and deliver the "click" sensation, and the strength of the sensation, may depend on properties of the square drive pulse, e.g. the amplitude and the length of the pulse. The predefined time t may be specified in the received haptic drive signal.

Figure 8:
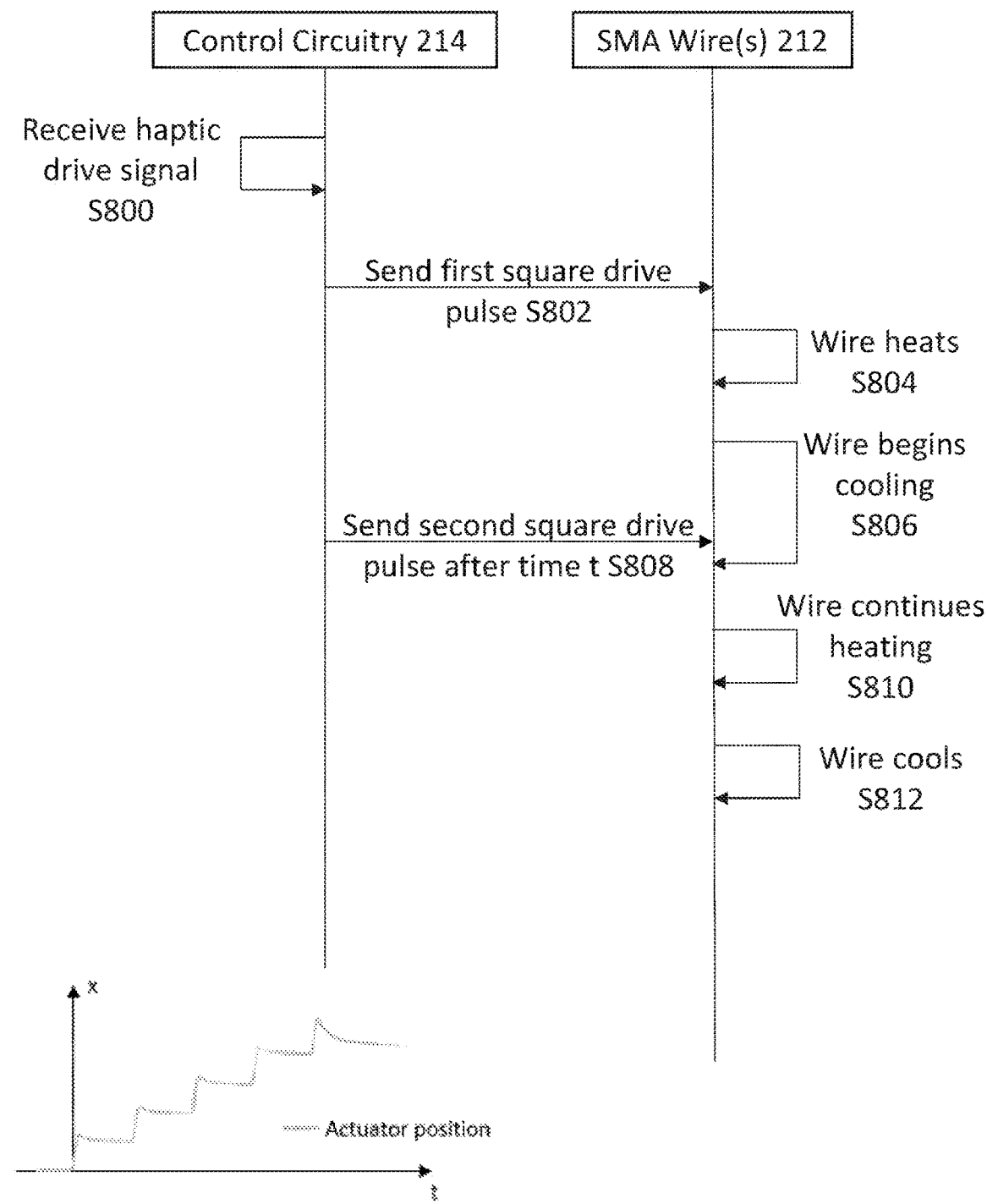
FIG. 8 is a schematic diagram of example steps to generate a haptic 'crunch' sensation.

FIG. 8 is a schematic diagram of example steps to generate a haptic 'crunch' sensation. The sensation may feel provide depth perception, as if the button is moving closer and closer to the user's skin or moving against the skin in distinct positions. The process begins when the control circuitry 214 receives a haptic drive signal to control the at least one SMA actuator wire 212 to deliver haptic feedback (step S800). The haptic drive signal comprises enough information for the control circuitry 214 to know how to control the at least one SMA actuator wire 212.

Responsive to receiving the haptic drive signal, the control circuitry 214 controls the at least one SMA actuator wire 212 using at least two different drive pulses (e.g. square drive pulses), where adjacent pulses are separated by a predefined duration. In embodiments, the control circuitry 214 may begin by using one long pulse to bring the SMA actuator wire 212 up to its operating temperature before delivering the two different drive pulses for the haptic feedback. The predefined duration may vary between adjacent pulses. The drive pulses may differ in their length/duration and/or energy. Thus, at step S802, the control circuitry 214 sends a first drive pulse to the at least one SMA actuator wire 212. The first drive pulse causes the SMA wire(s) 212 to heat-up and contract (step S804). Contraction of the SMA wire(s) 212 causes the moveable component of the haptic assembly 212 to move. While the SMA wire(s) 212 starts to cool down and lengthen (step S806) (using the biasing means), the control circuitry 214 sends a second, different, drive pulse after a predefined duration or time t (step S808). As the SMA wire(s) 212 has not fully cooled down, the SMA wire(s) now continues to heat-up and contract further to a length that is shorter than the final length reached at the end of the first heating cycle/first drive pulse (step S810). That is, the SMA wire(s) 212 has partially returned to its equilibrium state when the second drive pulse is sent, such that a target displacement of the moveable component is built-up over a sequence of drive pulses. This may give a user a sense of depth perception.

If only two drive pulses are sent, the SMA wire(s) 212 is able to cool down after the second drive pulse has been completed (step S812). Otherwise, one or more further drive pulses may be used to drive the SMA wire(s) 212. The time taken for the moveable component to move and deliver the "crunch" sensation, and the strength of the sensation, may depend on properties of the square drive pulse, e.g. the amplitude and the length of the pulse. The predefined time t (or times t1, t2 . . . tn, if the times between pulses are different) may be specified in the received haptic drive signal.

Some example methods for rendering haptic profiles defining instructions for driving SMA actuator wires, and for rendering haptic event pipelines, are now described with reference to FIGS. 9 to 18. It will be understood that these are merely examples of how haptic profiles and pipelines could be generated, and are provided to illustrate how the system architecture described above may be put into practice to deliver haptic feedback.

Figure 9:
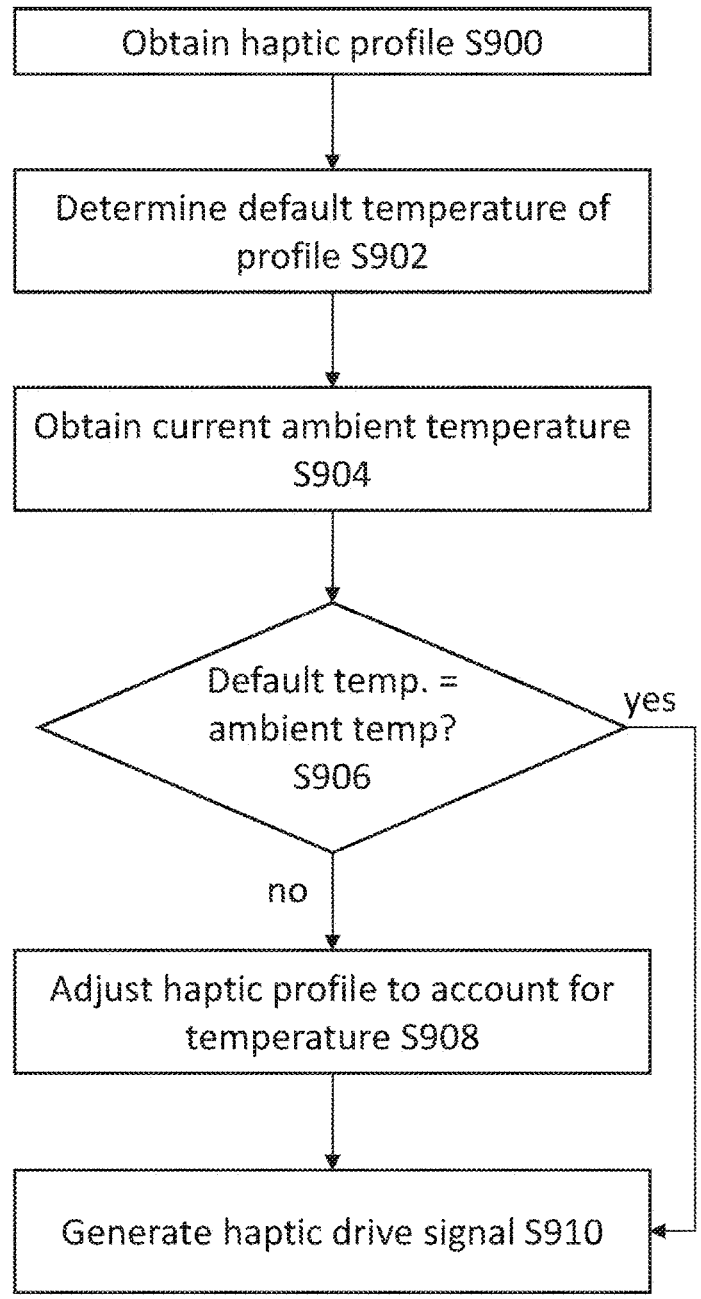
FIG. 9 is a flowchart of example steps to control a haptic button using environmental data.

FIG. 9 is a flowchart of example steps to control a haptic button using environmental data. The steps may be implemented during the process to render a haptic profile, or as part of a pipeline. The process begins by obtaining a haptic profile (step S900), either by selecting from a set of predefined haptic profiles or generating a haptic profile, as described above. As mentioned above, a haptic profile may be defined for a 'default' haptic assembly for a 'default' set of operating conditions (e.g. an ambient, external temperature of 21° C.). However, the apparatus may be being used in different conditions. The illustrated process shows one way in which differences between the default or ideal conditions and the actual conditions may be taken into account to deliver the required haptic feedback. Here, the condition is temperature, but it will be understood that this is just an illustrative example.

At step S902, the process comprises determining the default temperature associated with the obtained haptic profile, and at step S904 the current ambient temperature is obtained. The current ambient temperature may be stored in the apparatus and accessible to the process. At step S906, the default temperature and the current ambient temperature are compared. If the default temperature and current ambient temperature are equal or substantially equal, or within some permitted tolerance (e.g. ±10° C.), then a haptic drive signal is generated using the haptic profile obtained at step S900 and the haptic drive signal is used to control the at least one SMA actuator wire to deliver haptic feedback (step S910). However, if the default temperature and current ambient temperature are not equal or within the permitted tolerance, then the haptic profile is adjusted/modified to account for the difference in temperature (step S908). There are many ways in which the haptic profile may be modified to account for the difference in temperature while still ensuring that the delivered haptic sensation will be the same as if the apparatus was operating in an environment at the ideal/default temperature. The techniques may also depend on the magnitude of the difference in temperature. For example, if the current ambient temperature is 10° C. below the default temperature, then the amount of power used to drive the SMA actuator wires may be increased by a small amount, but if the current ambient temperature is more than 20° C. below the default temperature, then the power may be increased more significantly.

If the current ambient temperature is higher than the default temperature, the process may comprise determining a safe energy that can be delivered to the SMA actuator wires using a lookup table, for example. The lookup table may define safe energies for different operating/ambient temperatures. The energy of the drive pulse specified in the haptic profile obtained at step S900 may be decreased based on the determined safe energy, and the haptic profile may be modified accordingly. The aim, even when at high ambient temperatures, is to deliver the same or substantially the same haptic sensation.

Figure 10:
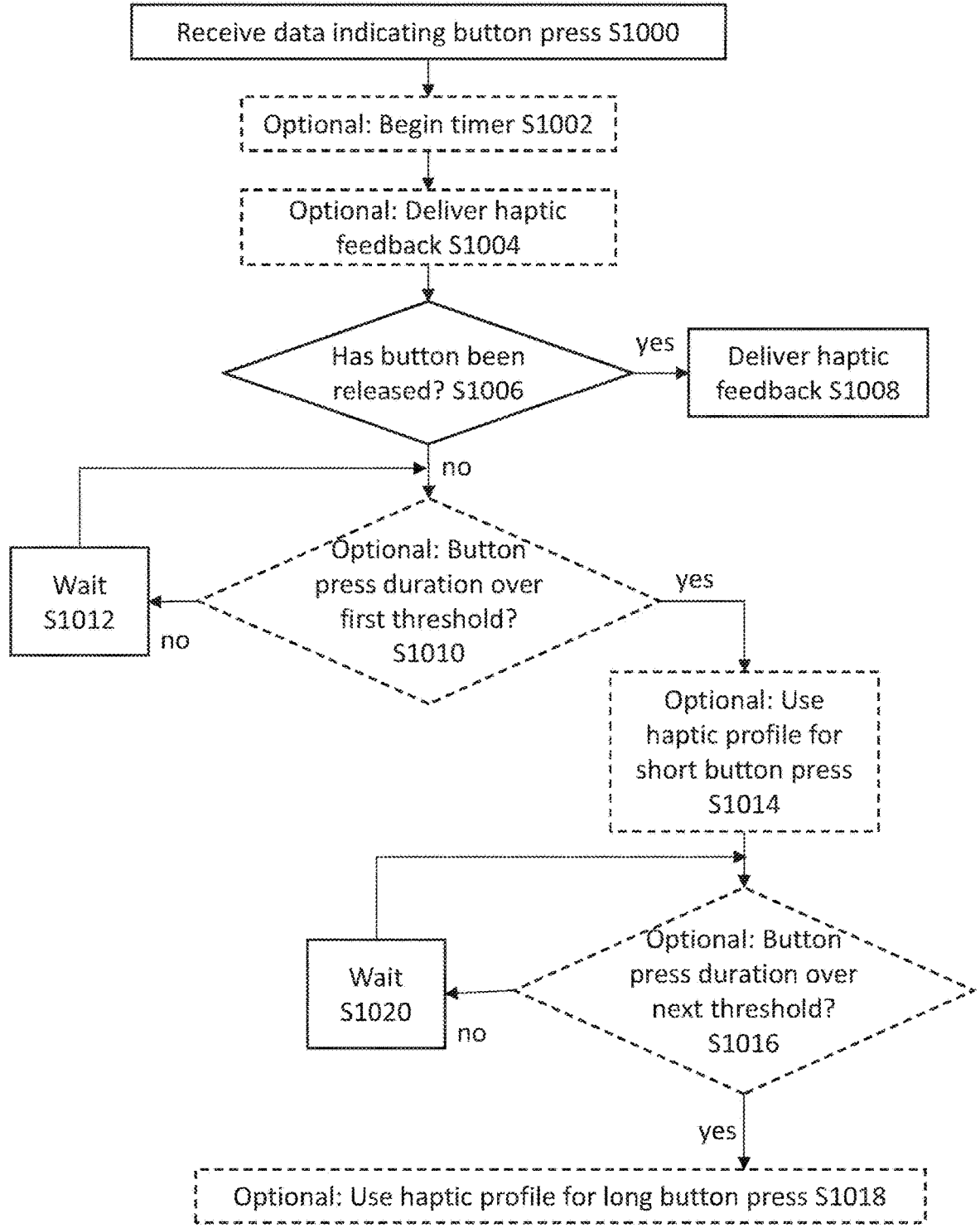
FIG. 10 is a flowchart of example steps to output haptic feedback when a button has been pressed and released.

FIG. 10 is a flowchart of example steps to output haptic feedback when a button has been pressed and released. The steps shown here are representative of just one of many possible ways to output haptic feedback, and are therefore one non-limiting example set of steps. The steps may be implemented during the process to render a haptic profile, or as part of a pipeline. In some cases, particular decision steps may initiate a whole new process or pipeline to be initiated.

The process begins at step S1000 by receiving data indicating that a button has been pressed and that haptic feedback is to be delivered. The button which is pressed may be a 'normal' or standard button, or it may be a haptic button. As mentioned above, the haptic feedback may be delivered via the button that has been pressed (if it is a haptic button) or via another haptic button. The data indicating that a button has been pressed may be received from a sensor, e.g. a force sensor, pressure sensor, capacitive sensor, touch sensor, contact switch etc. which changes value when a button is pressed.

Optionally, a timer may be started immediately after the data indicating a button press has been received (step S1002). This may be used if the duration of a button press triggers different types of haptic sensations.

Optionally, haptic feedback may be delivered at step S1004 if the mere fact that a button has been pressed is a trigger to deliver haptic feedback.

The next step in the process is to check if the button that has been pressed has also been released (step S1006). This may be determined using the sensor. If the button has been released, haptic feedback may be delivered (step S1008). If the button has not been released, the process checks if the button press duration is over a first threshold (step S1010). The first threshold may be a time indicative of a short button press. If the first threshold has not been reached, the process waits for some predetermined time (e.g. fractions of a second) (step S1012) before reperforming step S1006.

If the first threshold has been reached at step S1010, then optionally, the process may comprise rendering a haptic profile for a short button press (step S1014), based on the general process described above. The process continues (either from step S1010 or step S1014) to determine if the button press is now over the next threshold (step S1016). If the duration of the button press is greater than or equal to the next threshold duration, then the button press may be considered a "long" button press. The process then comprises rendering a haptic profile for a long button press (step S1018), based on the general process described above. If the button press has not reached this next threshold, then after a wait (step S1020), the check of step S1016 is performed again. In embodiments, the threshold used at step S1016 may change each time the loop is performed.

In embodiments, the thresholds of steps S1010 and S1016 may be determined using information about what action a user is attempting to perform using the button/slider. For example, if a user is attempting to change the volume of audio output, the thresholds may depend on how many available volume change increments are left for the user to select or scroll through. A different haptic sensation may be delivered for each threshold.

Figure 11:
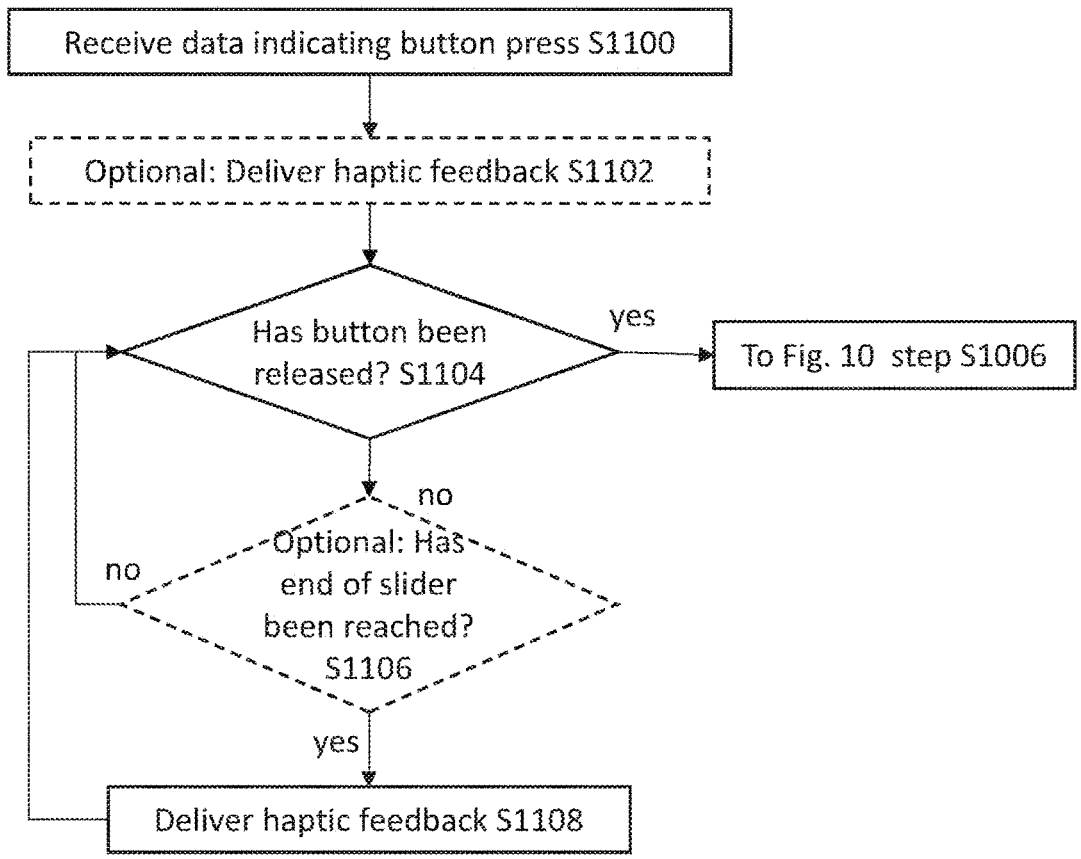
FIG. 11 is a flowchart of example steps to output haptic feedback if a button is not released after being pressed.

FIG. 11 is a flowchart of example steps to output haptic feedback if a button is not released after being pressed, as a way of alerting the user to stop pressing the button, for example. The steps shown here are representative of just one of many possible ways to output haptic feedback and alert a user, and are therefore one non-limiting example set of steps. The steps may be implemented during the process to render a haptic profile, or as part of a pipeline. In some cases, particular decision steps may initiate a whole new process or pipeline to be initiated.

The process begins at step S1100 by receiving data indicating that a button has been pressed and that haptic feedback is to be delivered. The button which is pressed may be a 'normal' or standard button, or it may be a haptic button. As mentioned above, the haptic feedback may be delivered via the button that has been pressed or via another button. The data indicating that a button has been pressed may be received from a sensor, e.g. a force sensor, pressure sensor, capacitive sensor, touch sensor, contact switch etc. which changes value when a button is pressed.

The next step in the process is to check if the button that has been pressed has also been released (step S1104). This may be determined using the sensor. If the button has not been released after some predetermined time (e.g. fractions of a second), haptic feedback may be delivered as a way of alerting the user that they should stop pressing the button (step S1108). This may be a useful way of preventing damage to a button or haptic button. If at step S1104 the button has been released, the process goes to step S1006 of FIG. 10.

Optionally, haptic feedback may be delivered in response to the button being pressed (step S1102). That is, as soon as the data indicating a button press is received, the process to deliver the appropriate haptic feedback may be begun. In this case, once the haptic feedback has been delivered, the process may continue to step S1104, to determine if the button has been released by the user. The above-described steps then apply.

Optionally, if at step S1104 (e.g. after performing the process of FIG. 10), it is determined that the button has not been released then a further check may be performed to determine if the button that is being pressed is being used to control a slider (e.g. a slider to control the volume of audio output, or a slider to scroll through a document) and whether the end of the slider has been reached (step S1106). If the end of the slider has been reached but the user is still pressing the button, haptic feedback may be delivered (step S1108) to alert the user to stop pressing the button. If the end of the slider has not been reached and the user is still pressing the button, the process returns to step S1104.

Figure 12:
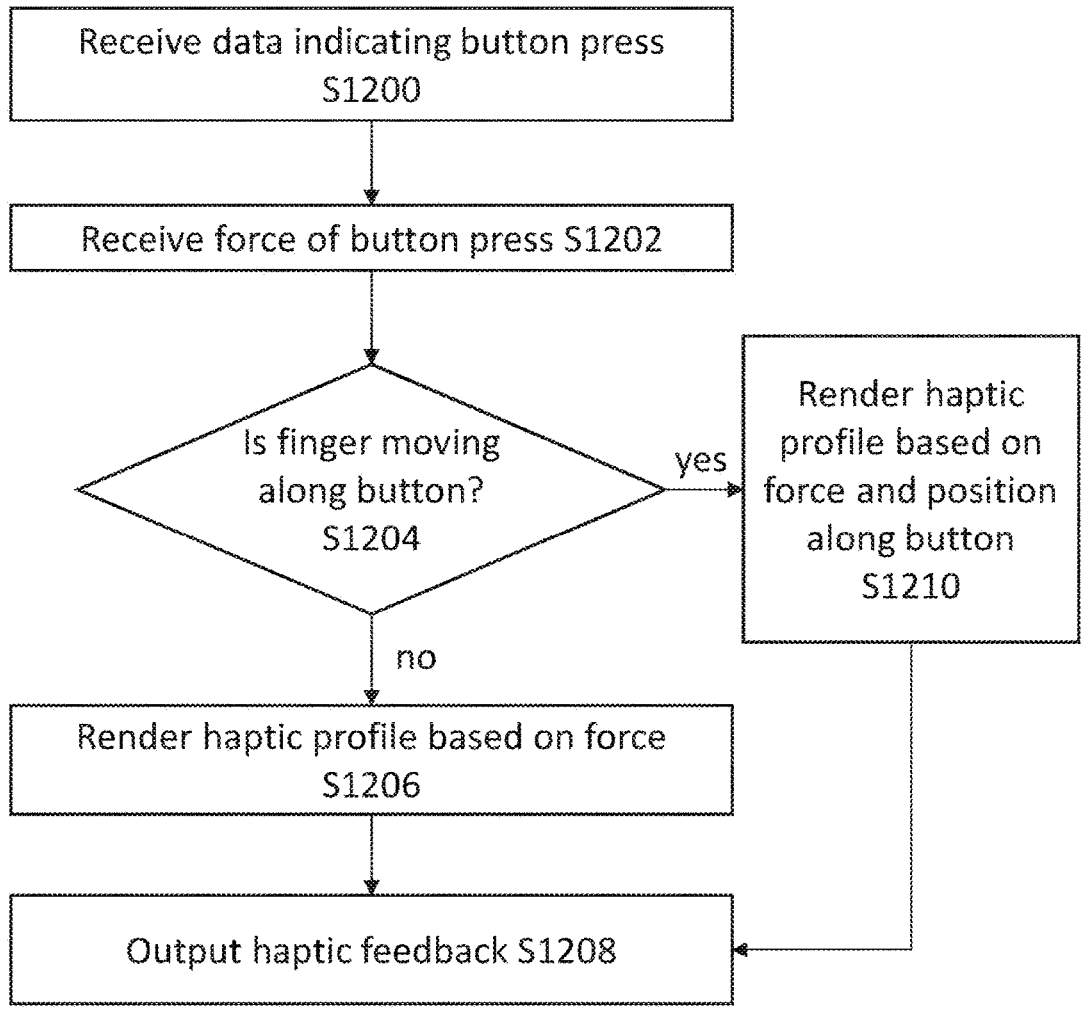
FIG. 12 is a flowchart of example steps to generate haptic feedback based on output of one or more sensors.

FIG. 12 is a flowchart of example steps to generate haptic feedback based on output of one or more sensors (e.g. force sensors). The steps shown here are representative of just one of many possible ways to output haptic feedback using sensor data, and are therefore one non-limiting example set of steps. The steps may be implemented during the process to render a haptic profile, or as part of a pipeline. In some cases, particular decision steps may initiate a whole new process or pipeline to be initiated.

The process begins at step S1200 by receiving data indicating that a button has been pressed and that haptic feedback is to be delivered. The button which is pressed may be a 'normal' or standard button, or it may be a haptic button. As mentioned above, the haptic feedback may be delivered via the button that has been pressed or via another button. The data indicating that a button has been pressed may be received from one or more sensors, e.g. a force sensor, capacitive sensor, touch sensor etc. which changes value when a button is pressed.

The process continues by receiving a value or data indicative of the force of the button press, i.e. the force applied by the user on the button (step S1202). At step S1204, the process determines if the user's finger is moving along the button or if the user's finger is static/applying a force on the button at one location. If at step S1204 the finger is determined to be static, then a process to render a haptic profile based on the force (or distribution of force across the button) of the button press is initiated (step S1206), and haptic feedback is delivered using the rendered haptic profile (step S1208). The haptic profile may be rendered in response to the absolute force and the position of the force along the button.

If at step S1204 the finger is determined to be moving along the button, then a process to render a haptic profile based on both the force of the button press and the position of the force along the button is initiated (step S1210), and haptic feedback is delivered using the rendered haptic profile (step S1208). These steps may be possible if the haptic assembly comprises two or more force sensors. A processor may be able to determine where the button is pressed or the type of contact that the user makes with the button (e.g. a touch or a swipe), by analysing the magnitude of the force detected by each force sensor. The force sensors may be arranged so that the location of a button press on the button can be determined.

Thus, in a further approach of the techniques disclosed herein, there is provided an apparatus for delivering a haptic effect, the apparatus comprising: a static component; a moveable component capable of movement relative to the static component for delivering a haptic effect; at least one SMA actuator wire arranged to drive the movement of the moveable component; a sensor arrangement arranged to sense user input to the moveable element; and drive circuitry arranged to supply a drive signal to the at least one SMA actuator wire for driving the at least one SMA actuator wire, wherein the sensor arrangement is arranged to sense the force of the user input and/or the position of the user input, and the control circuitry is arranged to vary the form of the drive signal in dependence on the sensed force and/or position of the user input. In either case, this improves the haptic function.

This approach may be applied in the case that the drive circuitry is arranged to supply the drive signal in response to user input sensed by the sensor arrangement, for example to deliver the haptic effect to the user as the user input is made.

Figure 13:
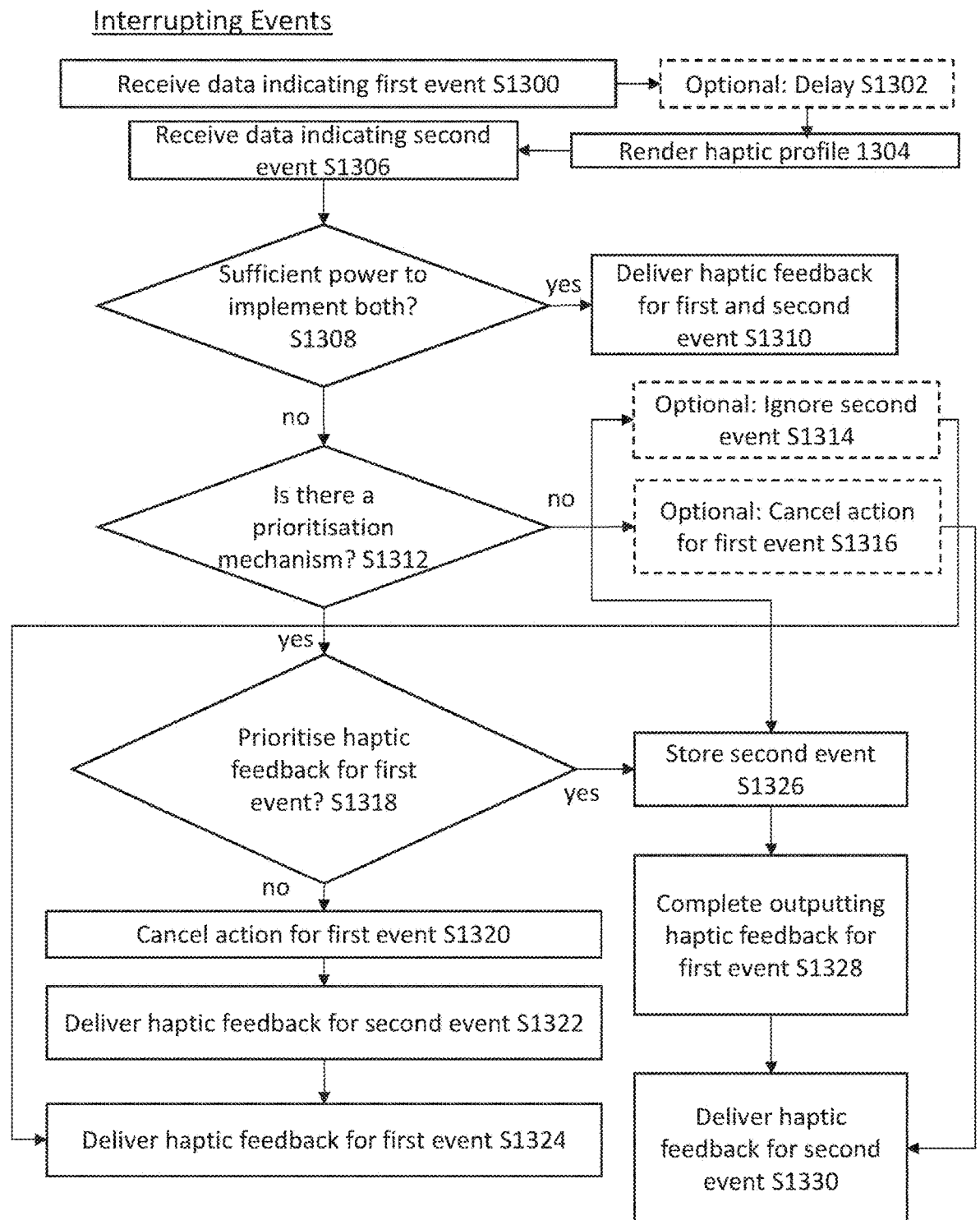
FIG. 13 is a flowchart of example steps to process a second event requesting haptic feedback after receiving a first event requesting haptic feedback.

FIG. 13 is a flowchart of example steps to process a second event received after a first event, where both events request or trigger haptic feedback delivery. The steps shown here are representative of just one of many possible ways to output haptic feedback when an interrupting event is received, and are therefore one non-limiting example set of steps. The steps may be implemented during the process to render a haptic profile, or as part of a pipeline. In some cases, particular decision steps may initiate a whole new process or pipeline to be initiated.

The process begins at step S1300 by receiving data indicating that a first event has taken place and that haptic feedback is to be delivered.

The process continues (optionally after a delay (step S1302)) by rendering a haptic profile (step S1304) and generating a drive signal, based on the general process described above, in order to deliver haptic feedback. During step S1304, data indicating a second event is received (step S1306). The second event also requests or triggers haptic feedback delivery. In embodiments, haptic feedback may be delivered for the two events using two different haptic assemblies (e.g. the two events specify different haptic buttons to be used for the haptic feedback deliver). Alternatively, haptic feedback may be delivered for the two events using the same haptic assembly/button at the same time. In the first case, it is necessary to determine if both haptic assemblies can be operated simultaneously. In the second case, it is necessary to determine which event should be prioritised.

Therefore, at step S1308, the process determines if there is sufficient power available to deliver haptic feedback for both events simultaneously (if two haptic assemblies are to be used). If the answer is yes, then haptic profiles are rendered for both buttons and haptic feedback is delivered using two haptic assemblies substantially simultaneously (step S1310). However, in many situations, the amount of power available to deliver haptic feedback may be limited, or there may only be a single haptic assembly available. For example, the amount of power available for haptic feedback in a smartphone may be limited by the battery/batteries and other power-drawing functions of the smartphone. Therefore, if the answer to step S1308 is no, then the process checks if there is a prioritisation mechanism in place (step S1312) which may define whether the feedback for the first event or the second event is to be delivered.

If there is no prioritisation mechanism is place, the process may take one of the following actions:
- ignore the second event entirely (step S1314) and proceed to deliver haptic feedback for the first event (step S1324); or
- cancel the action(s) associated with the first event (i.e. as started at step S1304), and proceed to deliver haptic feedback for the second event (step S1330); or
- temporarily store any information associated with the second event (step S1326), complete the process to deliver haptic feedback for the first event (step S1328), and then deliver haptic feedback for the second event (step S1330); or
- service both buttons/haptic assemblies simultaneously by interleaving pulses; or
- service both buttons/haptic assemblies simultaneously by switching to a PWM drive scheme.

If there is a prioritisation mechanism in place, the process may check if the first event should be prioritised over the second event (step S1318). If the answer is yes, the process may comprise temporarily storing any information associated with the second event (step S1326), completing the process to deliver haptic feedback for the first event (step S1328), and then delivering haptic feedback for the second event (step S1330). If the answer is no, then the process may comprise cancelling or postponing the action(s) associated with the first event (i.e. as started at step S1304), and then delivering haptic feedback for the second event (step S1322). Finally, the process to deliver haptic feedback for the first event may be restarted/resumed (step S1324).

Figure 14:
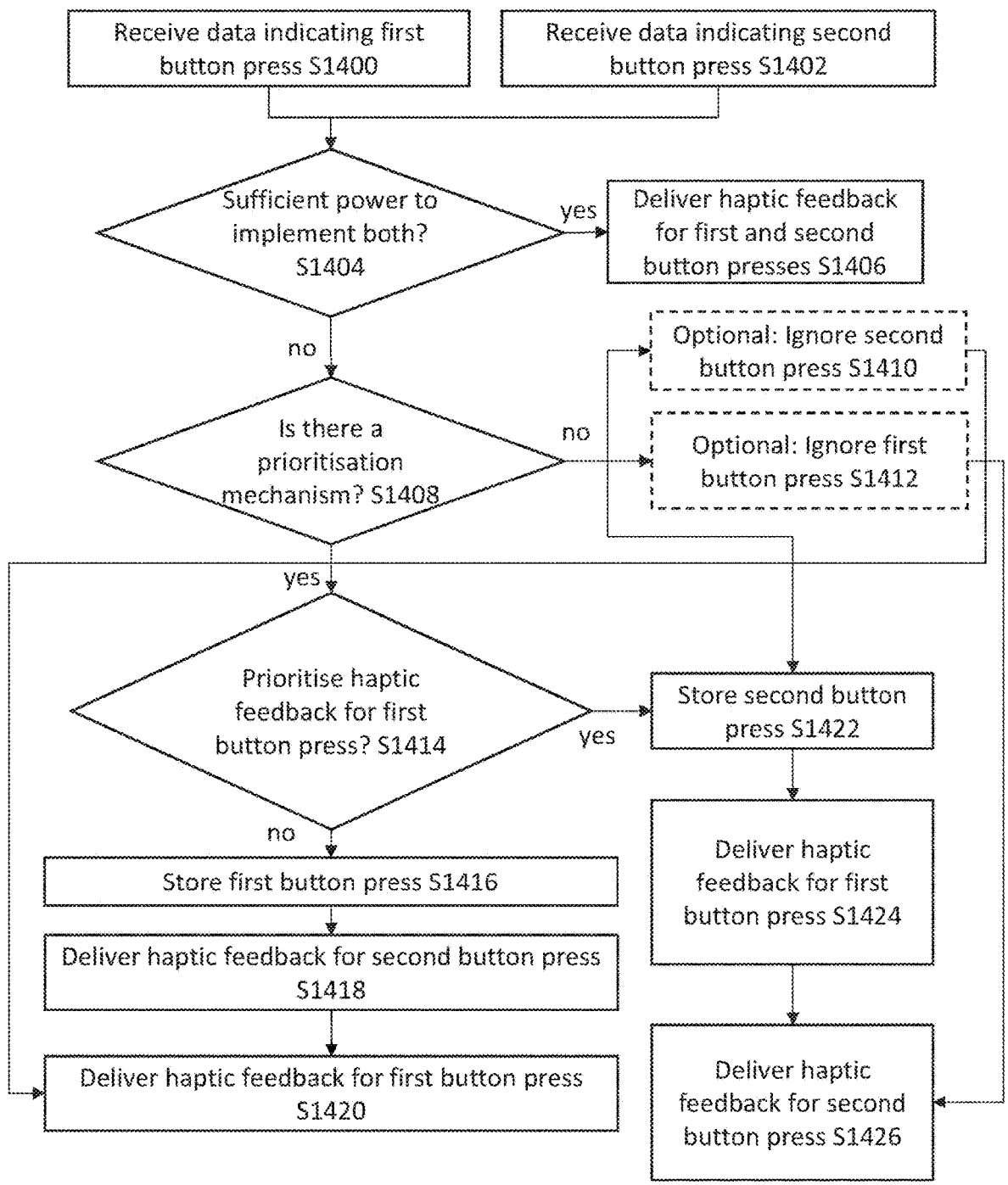
FIG. 14 is a flowchart of example steps to process simultaneous button presses.

FIG. 14 is a flowchart of example steps to process simultaneous button presses. The steps shown here are representative of just one of many possible ways to output haptic feedback when two buttons are pressed simultaneously, and are therefore one non-limiting example set of steps. The steps may be implemented during the process to render a haptic profile, or as part of a pipeline. In some cases, particular decision steps may initiate a whole new process or pipeline to be initiated.

The process begins at steps S1400 and S1402 by receiving data indicating that a first button has been pressed and that a second button has been pressed, and that haptic feedback is to be delivered in response to each button press. The buttons which are pressed may be 'normal' or standard buttons, or they may be haptic buttons, or one button may be a standard button and the other may be a haptic button. As mentioned above, the haptic feedback may be delivered via the button that has been pressed or via another button. The data indicating that a button has been pressed may be received from one or more sensors, e.g. a force sensor, pressure sensor, capacitive sensor, touch sensor, contact switch etc. which changes value when a button is pressed.

The process continues by determining if there is sufficient power available to deliver haptic feedback to both the first button and the second button simultaneously (step S1404). If the answer is yes, then haptic profiles are rendered for both buttons and haptic feedback is delivered to both buttons substantially simultaneously (step S1406). However, in many situations, the amount of power available to deliver haptic feedback may be limited. For example, the amount of power available for haptic feedback in a smartphone may be limited by the battery/batteries and other power-drawing functions of the smartphone. Therefore, if the answer to step S1404 is no, then the process checks if there is a prioritisation mechanism in place (step S1408) which may define whether the first button or the second button is to be activated first in order to deliver haptic feedback.

If there is no prioritisation mechanism is place, the process may take one of the following actions:
- ignore the second button press entirely (step S1410) and proceed to deliver haptic feedback for the first button press (step S1420); or
- ignore the first button press entirely (step S1412), and proceed to deliver haptic feedback for the second button press (step S1426); or
- temporarily store any information associated with the second button press (step S1422), complete the process to deliver haptic feedback for the first button (step S1424), and then deliver haptic feedback for the second button press (step S1426).
- service both buttons simultaneously by interleaving pulses; or
- service both buttons simultaneously by switching to a PWM drive scheme.

If there is a prioritisation mechanism in place, the process may check if the first button press should be prioritised over the second button press (step S1414). If the answer is yes, the process may comprise temporarily storing any information associated with the second button press (step S1422), completing the process to deliver haptic feedback for the first button (step S1424), and then delivering haptic feedback for the second button press (step S1426). If the answer is no, then the process may comprise temporarily storing any information associated with the first button press (step S1416), and then delivering haptic feedback for the second button press (step S1418). Finally, the process to deliver haptic feedback for the first button press may be started (step S1420).

Figure 15:
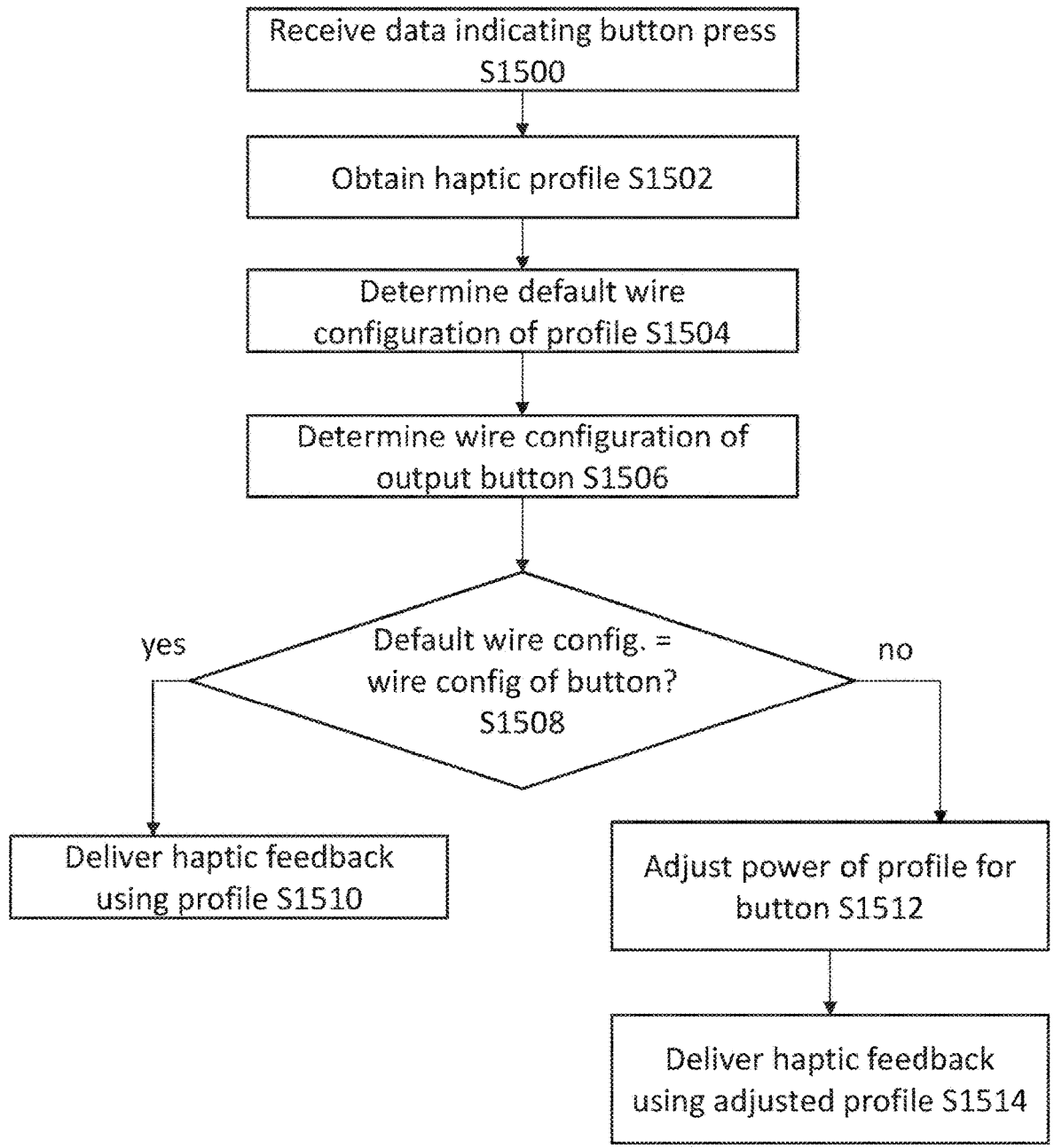
FIG. 15 is a flowchart of example steps to output haptic feedback to a button other than the button that is pressed.

FIG. 15 is a flowchart of example steps to output haptic feedback to a button other than the button that is pressed. The steps may be implemented during the process to render a haptic profile, or as part of a pipeline. The process begins by receiving data indicating that a button has been pressed and that haptic feedback is to be delivered (step S1500). At step S1502, a haptic profile is obtained either by selecting from a set of pre-defined haptic profiles or generating a haptic profile, as described above. As mentioned above, a haptic profile may be defined for a 'default' haptic assembly for a 'default' set of operating conditions. In FIG. 9, a process for dealing with a difference between a default operating condition and an actual operating condition is described. Here, a process for dealing with a difference between a default haptic assembly and an actual haptic assembly is described.

At step S1504, the process comprises determining the default wire configuration associated with the obtained haptic profile, and at step S1506 the actual wire configuration of the button which is to be used to deliver the haptic feedback (which may or may not be the same button that was pressed) is obtained. A description of the actual wire configuration may be stored in the apparatus and accessible to the process. The default wire configuration may specify a certain number of SMA actuator wires and the properties of each wire (e.g. length, diameter, coated with insulation or not, material, etc.) The default wire configuration may specify a wire volume and wire resistance. Similarly, the description of the actual wire configuration may specify the same or similar details. At step S1508, the default wire configuration and the actual wire configuration are compared. For example, the default wire configuration may specify that the moveable component of the haptic assembly is coupled to two parallel SMA actuator wires, each of thickness 36 µm. If the default wire configuration and actual wire configuration are the same, then a haptic drive signal is generated using the haptic profile obtained at step S1500 and the haptic drive signal is used to control the at least one SMA actuator wire to deliver haptic feedback (step S1510). However, if the default wire configuration and actual wire configuration are not equal, then the haptic profile is adjusted/modified to account for the difference in wire configuration (step S1512), and the adjusted haptic profile is used to deliver haptic feedback (step S1514). There are many ways in which the haptic profile may be modified to account for the difference. For example, if the default wire configuration specifies two parallel wires, each of thickness 36 µm, but the actual wire configuration is three parallel wires each of thickness 36 µm, then the energy used to drive the SMA actuator wires may need to be reduced.

Figure 16:
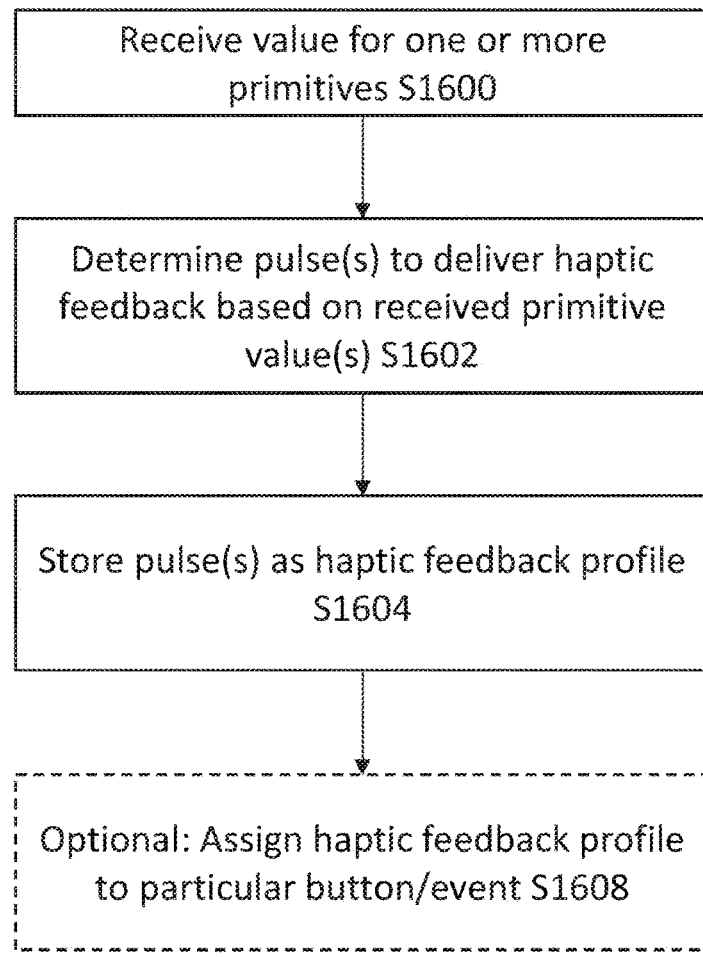
FIG. 16 is a flowchart of further example steps to control a haptic button using environmental data.

FIG. 16 is a flowchart of example steps to generate a haptic feedback profile, either for storing as one of the pre-defined haptic profiles, or when generating a generated haptic profile on-the-fly. As explained above, a haptic profile may be generated using one or more primitives. The process may comprise receiving or obtaining one or more primitive values (step S1600). The primitives describe the sort of haptic feedback that is to be delivered, and this needs to be converted into one or more pulses (or a description of the pulses). Thus, at step S1602, the process comprises determining the pulse(s) needed to deliver a haptic sensation in accordance with the received primitive values. The pulse(s) may optionally be stored as a haptic profile at step S1604, either permanently in the set of pre-defined haptic profiles, or temporarily for use in delivering haptic feedback immediately. (Profile generation on-the-fly is also possible, as described above). Optionally, a haptic profile may be assigned to a particular button, type of button press (e.g. short press, long press, swipe, etc.), or to a particular event or action (step S1608). This assignment may be used to help determine which pre-defined haptic profile should be used when a button is pressed.

Figure 17:
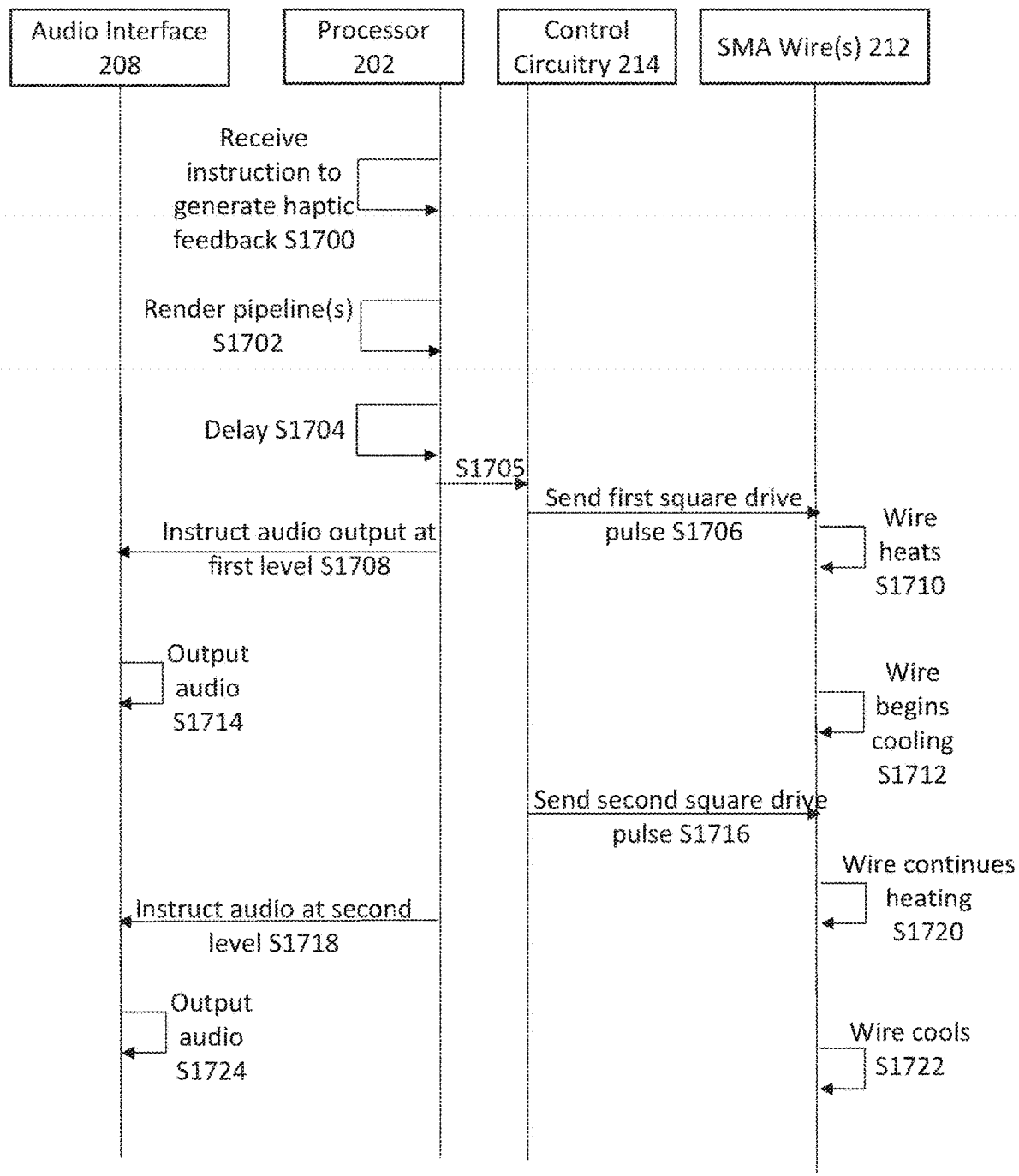
FIG. 17 is a flowchart of example steps to generate a haptic feedback profile.

FIG. 17 shows an example pipeline comprising different types of event, including a haptic event. The process begins when processor 202 receives an instruction to generate and deliver haptic feedback (step S1700), in response to a button being pressed. The button that is pressed in this illustrative example is used to adjust the volume of an audio output (delivered via an audio interface 208). The process continues by rendering a pipeline to achieve two things: to deliver haptic feedback and to change the volume of the audio output. The first action or event of the pipeline may be to delay taking any action (step S1704), so that the haptic feedback and the change in the volume can be synchronised. The next step may be to render a haptic profile and generate a drive signal using the haptic profile. The generated drive signal is sent to the control circuitry 214 which controls the SMA actuator wire(s) 212 (step S1705). At step S1706, the control circuitry uses the received drive signal to send a first drive pulse to the SMA actuator wire(s) (step S1706). This causes the wire to heat up and contract, thereby causing movement of the moveable component of the haptic assembly (step S1710). Before or while the moveable component is moving, the processor 202 instructs the audio to be output at a first level or volume via the audio interface 208 (step S1708). Thus, the audio is output while the moveable component is moving (step S1714), and before the SMA actuator wire(s) starts cooling (step S1712).

The process then comprises the control circuitry using the received drive signal to send a second drive pulse to the SMA actuator wire(s) (step S1716). This causes the wire to heat up and contract, thereby causing movement of the moveable component of the haptic assembly (step S1720). Before or while the moveable component is moving, the processor 202 instructs the audio to be outputted at a second level or volume via the audio interface 208 (step S1718). Thus, the audio is outputted while the moveable component is moving (step S1724), and before the SMA actuator wire(s) starts cooling (step S1722). In this way, each time the volume changes, a haptic sensation is also delivered, as a way of confirming the action the user is trying to take. The type of haptic sensation delivered at step S1706 and step S1716 may be the same or may be different.

Other examples of pipelines include:
- generating one haptic sensation when a user lightly presses a button to focus a camera, and generating another haptic sensation when a user presses the button more firmly to capture an image;
- generating one haptic sensation when a user successfully performs an action/a transaction using near field communication (NFC), e.g. a payment, and generating a different haptic sensation when the NFC action/transaction is unsuccessful;
- generating different haptic sensations for a fitness tracker—e.g. one indicating a user's heart rate is above a threshold, another indicating a certain distance or time has elapsed, etc; and
- generating different haptic sensations during gaming depending on what is happening in the game or what actions a user is taking in the game.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An apparatus for delivering haptic feedback comprising:
    a static component;
    a moveable component moveable relative to the static component;
    at least one shape memory alloy (SMA) actuator wire for moving the moveable component relative to the static component to deliver haptic feedback;
    control circuitry for controlling the at least one SMA actuator wire; and
    at least one processor, communicatively coupled to the control circuitry, to:
        receive environmental data of the at least one SMA actuator wire;
        receive an input signal requesting haptic feedback to be delivered;
        render a haptic profile defining instructions for driving the at least one SMA actuator wire, wherein rendering the haptic profile takes into account the environmental data;
        generate a haptic drive signal using the rendered haptic profile; and
        transmit, to the control circuitry, the haptic drive signal to control the at least one SMA actuator wire to deliver haptic feedback, wherein the at least one SMA actuator wire is controlled to deliver substantially the same haptic feedback by delivering substantially the same contraction and lengthening of the at least one SMA actuator wire, regardless of the environmental data.

2. The apparatus as claimed in claim 1, wherein rendering the haptic profile comprises rendering a haptic profile using at least one primitive value.

3. The apparatus as claimed in claim 2, wherein the at least one primitive value comprises at least three primitive values defining pulse intensity, a duration between pulses, and a number of pulses.

4. The apparatus as claimed in claim 2, wherein the at least one primitive value is a fixed constant.

5. The apparatus as claimed in claim 1, further comprising:
    storage storing a plurality of primitive values,
    wherein rendering the haptic profile comprises:
        selecting, from the storage, at least one primitive value; and
        rendering the haptic profile using the selected at least one primitive value.

6. The apparatus as claimed in claim 5, wherein rendering the haptic profile comprises:
    modifying one or more of the selected at least one primitive value; and
    rendering the haptic profile using the modified at one or more primitive value.

7. The apparatus as claimed in claim 1, further comprising:
    storage storing a plurality of haptic profiles,
    wherein rendering the haptic profile comprises:
        selecting, from the storage, a haptic profile.

8. The apparatus as claimed in claim 7, wherein rendering the haptic profile further comprises:
    modifying the selected haptic profile using the received environmental data.

9. The apparatus as claimed in claim 5, wherein rendering the haptic profile comprises:
    selecting, from the storage, at least one primitive value based on the received environmental data; and
    rendering the haptic profile using the at least one selected primitive value.

10. The apparatus as claimed in claim 5, wherein rendering the haptic profile comprises:
    selecting, from the storage, at least one primitive value; and
    rendering the haptic profile using the selected at least one primitive value and the environmental data.

11. The apparatus as claimed in claim 1, wherein, responsive to receiving an input signal requesting haptic feedback, the at least one processor renders a haptic event pipeline comprising at least one action to be performed, wherein the haptic event pipeline comprises at least one action to deliver haptic feedback, the action comprising rendering the haptic profile defining the instructions for driving the at least one SMA actuator wire, generating the haptic drive signal using the rendered haptic profile; and transmitting, to the control circuitry, the haptic drive signal to control the at least one SMA actuator wire to deliver the haptic feedback.

12. The apparatus as claimed in claim 11, further comprising:
    storage storing a plurality of actions,
    wherein rendering the haptic event pipeline comprises:
        selecting, from the storage, at least one action; and
        rendering the haptic event pipeline using the selected at least one action.

13. The apparatus as claimed in claim 11, further comprising:

storage storing a plurality of haptic event pipelines,
wherein rendering the haptic event pipeline comprises:
selecting, from the storage, a haptic event pipeline.

14. The apparatus as claimed in claim 12, wherein rendering the haptic event pipeline comprises:
selecting, from the storage, at least one action based on the received environmental data; and
rendering the haptic event pipeline using the selected at least one action.

15. The apparatus as claimed in claim 1, wherein the step of receiving an input signal requesting haptic feedback to be delivered comprises receiving an input signal triggered by detection of contact on a pressable button or touch-sensitive portion of the apparatus.

16. The apparatus as claimed in claim 1, wherein the haptic drive signal is a pulse width modulated drive signal.

17. The apparatus as claimed in claim 6, wherein the received environmental data comprises one or more of: a state of the at least one SMA actuator wire, a history of the at least one SMA actuator wire, a sensed temperature in the vicinity of the at least one SMA actuator wire, an estimated temperature of the at least one SMA actuator wire, humidity in the vicinity of the at least one SMA actuator wire, age of the at least one SMA actuator wire, or a resistance of the at least one SMA actuator wire.

18. A method for delivering haptic feedback using a haptic assembly comprising a static component, a moveable component moveable relative to the static component, and at least one shape memory alloy (SMA) actuator wire for moving the moveable component relative to the static component to deliver haptic feedback, the method comprising:
receiving environmental data of the at least one SMA actuator wire;
receiving an input signal requesting haptic feedback to be delivered;
rendering a haptic profile defining instructions for driving the at least one SMA actuator wire, wherein rendering the haptic profile takes into account the environmental data;
generating a haptic drive signal using the rendered haptic profile; and
transmitting the haptic drive signal to control the at least one SMA actuator wire to deliver haptic feedback by delivering substantially the same contraction and lengthening of the at least one SMA actuator wire, wherein the at least one SMA actuator wire is controlled to deliver substantially the same haptic feedback regardless of the environmental data.

* * * * *